(12) United States Patent
Abe

(10) Patent No.: US 7,260,680 B2
(45) Date of Patent: Aug. 21, 2007

(54) STORAGE APPARATUS HAVING MICROPROCESSOR REDUNDANCY FOR RECOVERY FROM SOFT ERRORS

(75) Inventor: Seiichi Abe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 492 days.

(21) Appl. No.: 10/994,602

(22) Filed: Nov. 23, 2004

(65) Prior Publication Data

US 2006/0075186 A1    Apr. 6, 2006

(30) Foreign Application Priority Data

Oct. 4, 2004    (JP) .............................. 2004-291629

(51) Int. Cl.
*G06F 12/00* (2006.01)

(52) U.S. Cl. ........................... 711/113; 711/4; 711/100; 711/111; 711/158; 710/1; 714/3

(58) Field of Classification Search ................ 711/113, 711/4, 100, 111, 158; 710/1; 714/3
See application file for complete search history.

(56) References Cited

U.S. PATENT DOCUMENTS

| | | | | |
|---|---|---|---|---|
| 5,748,909 | A | * | 5/1998 | Nakabayashi ............... 710/100 |
| 6,073,251 | A | * | 6/2000 | Jewett et al. ................... 714/7 |
| 6,081,812 | A | * | 6/2000 | Boggs et al. ................ 707/202 |
| 6,263,452 | B1 | * | 7/2001 | Jewett et al. .................... 714/9 |
| 6,393,538 | B2 | * | 5/2002 | Murayama ................... 711/162 |
| 6,604,176 | B1 | * | 8/2003 | MacLellan et al. ......... 711/149 |
| 6,986,078 | B2 | * | 1/2006 | Rodbell et al. ............... 714/10 |

FOREIGN PATENT DOCUMENTS

JP    2003-058323    8/2001

OTHER PUBLICATIONS

Lai et al., "Ditto Processor," pp. 525-534, IEEE, Jun. 2002.*
Weaver et al., "Techniques to Reduce the Soft Error Rate of a High-Performance Microprocessor," pp. 264-275, IEEE, Jun. 2004.*

* cited by examiner

*Primary Examiner*—Stephen C. Elmore
(74) *Attorney, Agent, or Firm*—Reed Smith LLP; Stanley P. Fisher, Esq.; Juan Carlos A. Marquez, Esq.

(57) ABSTRACT

There is provided a storage apparatus, which can continue processes to a host without making it recognize any soft errors as failure even if the errors occur in its microprocessor. The storage apparatus comprises: a plurality of host interface control circuits controlling data transfer with a host; a disk interface control circuit controlling data transfer with a physical memory device; a cache memory board storing the data temporarily; and a switch board connecting the host interface control circuits, disk interface control circuit, and cache memory board, wherein each of the host interface control circuits has two or more CPUs and when a soft error occurs in the CPU, data transfer process with the host is inherited to the CPU in which no soft error occurs, so that a reset process to the CPU in which the soft error has occurred is carried out.

20 Claims, 19 Drawing Sheets

STORAGE APPARATUS HAVING MICROPROCESSOR REDUNDANCY FOR RECOVERY FROM SOFT ERRORS

CROSS-REFERENCE TO RELATED APPLICATION

The present application claims priority from Japanese patent application No. JP 2004-291629 filed on Oct. 4, 2004, the content of which is hereby incorporated by reference into this application.

BACKGROUND OF THE INVENTION

The present invention relates to a storage apparatus and more specifically to a technique effectively applied to a process required at a time of occurrence of soft errors of memory cells in a microprocessor (CPU) owing to disturbances such as a (alpha) rays, neutrons, and electromagnetic waves.

Conventionally, in a storage apparatus that supplies memory areas to hosts such as servers, a host interface control unit that controls data transfer with hosts has been controlled by a microprocessor (for example, see Japanese Patent Laid-open No. 2003-58323).

Recently, as LSIs are miniaturized, the incidence of soft errors that occur in a primary cache or general purpose register built in the microprocessor of the host interface control due to disturbances such as a (alpha) rays, neutrons, and electromagnetic waves has become high.

When the soft errors occur in the microprocessor, control from the microprocessor is impossible and the host interface control unit becomes inoperative. Then, on a side of the host, an I/O access becomes time over and this is recognized as failure of the host interface control unit in which the soft errors have occurred, so that its path is blocked and a change of the path is made.

SUMMARY OF THE INVENTION

However, in the case where only the soft errors have occurred, the host interface control unit is reset and restarted and thereby returns to normal conditions. However, in the conventional storage apparatus, once soft errors have occurred and the path has been blocked by the host, its recovery work becomes a work object of an exchange by maintenance workers and even when the recovery is made by restarting the host interface control unit, work by maintenance workers has been necessary.

Accordingly, an object of the present invention is to provide a storage apparatus, which can continue processes to a host without making it recognize any soft errors as failure even if the errors occur in its microprocessor.

Outlines of representative ones of inventions disclosed in the present application will be briefly described as follows.

A storage apparatus according to the present invention comprises: a plurality of host interface control circuits controlling data transfer with a host device; a disk interface control circuit controlling data transfer with a physical memory device; a cache memory temporarily storing said data; and a switch connecting said host interface control circuits, disk interface control circuit, and cache memory, wherein each of said host interface control circuits has two or more microprocessors and when a soft error occurs in said microprocessor, a data transfer process with said host device is inherited to the other microprocessor in which the soft error does not occur, so that a reset process is carried out to the microprocessor in which said soft error has occurred.

Also, a storage apparatus according to the present invention comprises: a plurality of host interface control circuits controlling data transfer with a host device; a disk interface control circuit controlling data transfer with a physical memory device; a cache memory temporarily storing said data; and a switch connecting said host interface control circuits, disk interface control circuit, and cache memory, wherein said disk interface control circuit has two or more microprocessors and when a soft error occurs in said microprocessor, a data transfer process with said physical memory device is inherited to the microprocessor in which the soft error does not occur, so that a reset process is carried to the microprocessor in which said soft error has occurred.

Further, a storage apparatus according to the present invention comprises: a plurality of network connection storages that control data transfer with a host device; a disk interface control circuit controlling data transfer with a physical memory device; a cache memory storing temporarily said data; and a switch connecting said network connection storages, disk interface control circuit, and cache memory, wherein each of said network connection storages has two or more server blocks and when a soft error occurs in a microprocessor in said server blocks, a data transfer process with said host device is inherited to the server block in which said soft error does not occur, so that a reset process is carried out to the microprocessor in the server block in which said soft error has occurred.

Effects obtained from representative ones of inventions disclosed in the present application will be briefly described as follows.

According to the present invention, the storage apparatus can be provided which can continue processes to the host without making it recognize any soft errors as failure even if the errors occur in its microprocessor.

DESCRIPTION OF THE PREFERRED EMBODIMENTS

Figure 1:
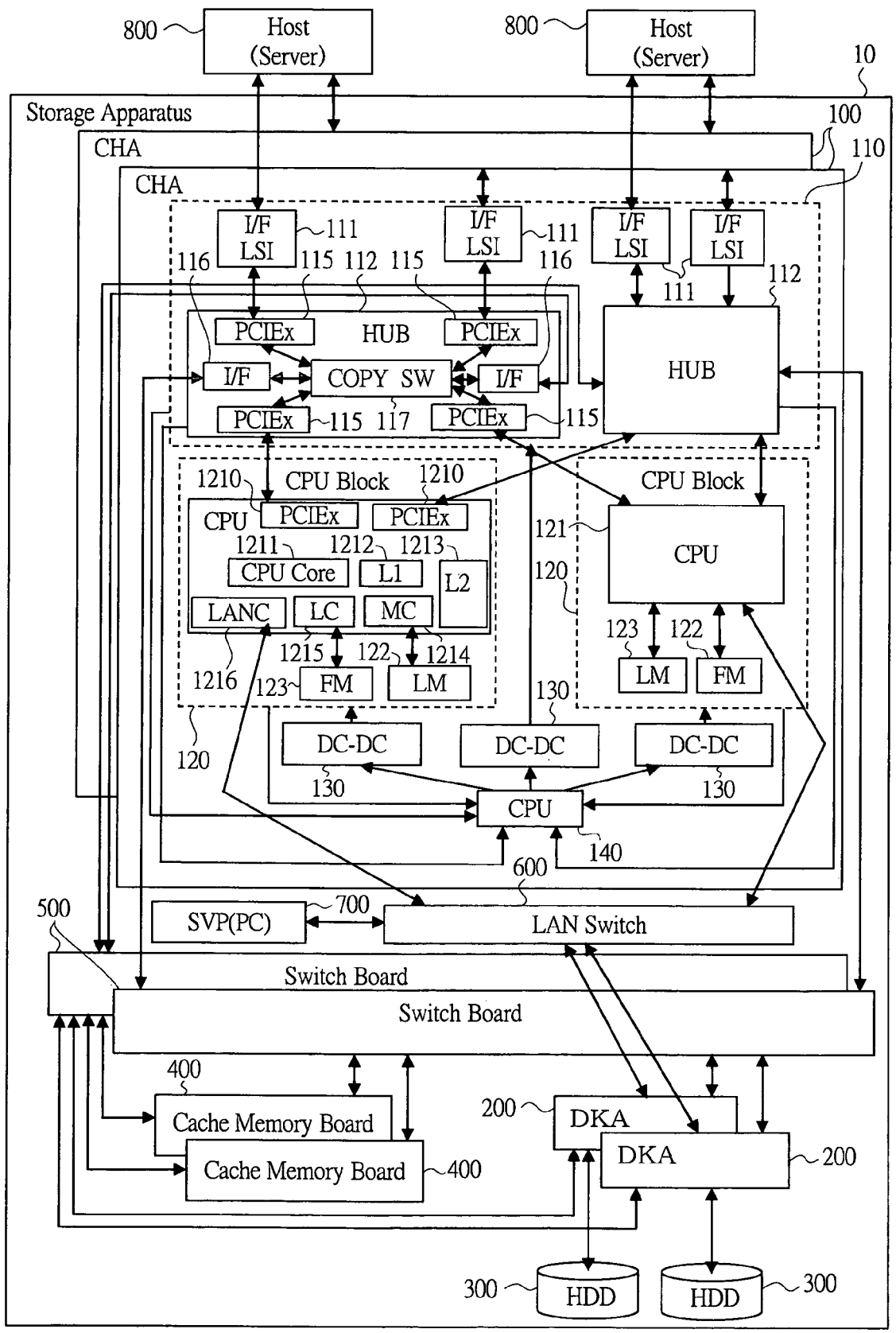
FIG. 1 is a block diagram showing a configuration of a storage apparatus according to a first embodiment of the present invention.

Hereinafter, embodiments of the present invention will be detailed based on the drawings. Note that the same members will be denoted in principle by the same reference numeral throughout all the drawings for describing the embodiments and the repetitive explanation thereof will be omitted.

First Embodiment

<Configuration of Storage Apparatus>

With reference to FIG. 1, a configuration of a storage apparatus according to a first embodiment of the present invention will be explained hereinafter. FIG. 1 is a block diagram showing a configuration of a storage apparatus according to a first preferred embodiment of the present invention.

In the figure, a storage apparatus 10 comprises a host interface control circuit (CHA) 100, a disk interface control circuit (DKA) 200, physical memory devices 300 such as hard disks (HDDs), cache memory boards 400, switch boards 500, a LAN switch 600, and a service processor (SVP) 700.

The host interface control circuit 100 comprises an interface block 110, CPU blocks 120, DC-DC power sources 130, and a CPU 140 for controlling the DC-DC power source, and controls data transfer with hosts (upper devices) 800 such as servers.

The interface block 110 comprises interface control LSIs 111 and HUBs 112.

The HUB 112 comprises PCI-Expresses controller 115 that are interfaces connected to the interface control LSIs 111 and the CPU blocks 120, interfaces 116 connected to the switch boards 500, and a switch 117 having a copy function of controlling data transfer between the PCI-Express controller 115 and the interface 116.

The CPU block 120 comprises a CPU (microprocessor) 121, a local memory 122, and a flash memory 123.

The CPU 121 is configured by: PCI-Expresses controller 1210 that is interfaces connected to the interface block 110; a CPU core 1211; a primary cache memory 1212; a secondary cache memory 1213; a memory controller 1214 that controls the local memory 122; a local bus controller 1215 that controls the flash memory 123; and a LAN controller 1216 connected to the LAN switch 600.

Note that, as the respective interfaces of the PCI-Expresses controller 115 and the PCI-Expresses controller 1210 used in the HUBs 112 and the CPUs 121, PCI-X interfaces or other interfaces may be used too.

The DC-DC power sources 130 are controlled by the CPU 140 that is controlled from the respective HUBs 112 and the respective CPU blocks 120, and are arranged to the interface block 110 and the CPU blocks 120 respectively, and can individually control supply of the power sources to the respective CPU blocks 120.

The disk interface control circuits 200 control data transfer with the physical memory devices 300.

The cache memory boards 400 temporarily store data that is controlled by the host interface control circuits 100 and the disk interface control circuits 200.

The switch boards 500 connect the host interface control circuits 100, the disk interface control circuits 200, and the cache memory boards 400 to one another, and control the data transfer among them.

The LAN switch 600 connects the service processor 700 to the host interface control circuits 100 and the disk interface control circuits 200.

The service processor 700 displays information in the storage apparatus 10, and inputs information of various operations and settings.

In the present embodiment, in one host interface control circuit 100, two or more CPUs 121 are provided and data transfer to the respective CPUs 121 is controlled by the respective HUBs 112, whereby interfaces such as the interface control LSIs 111 may be controlled by any of the CPUs 121.

Further, when soft errors occur, for example, a warning screen showing that the soft errors have occurred is displayed to the service processor 700. Further, when there are many soft errors per day, there is a fear for hardware failure, so that hard errors are displayed and the relevant CPU is stopped.

<Soft Error Occurrence>

Figure 2:
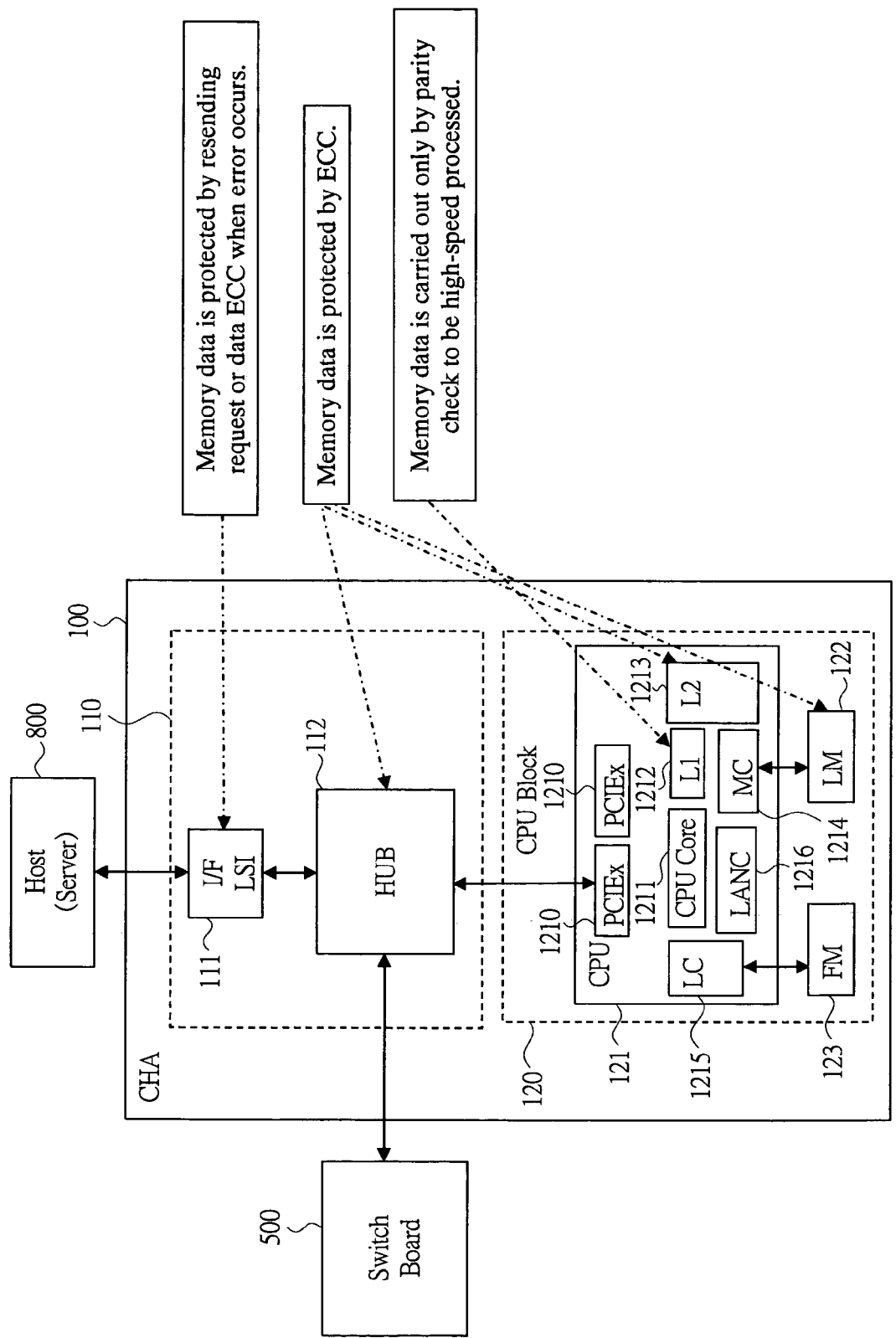
FIG. 2 is an explanatory diagram for showing an occurrence place of a soft error that occurs in a host interface control circuit of a storage apparatus according to a first embodiment of the present invention.
Figure 3:
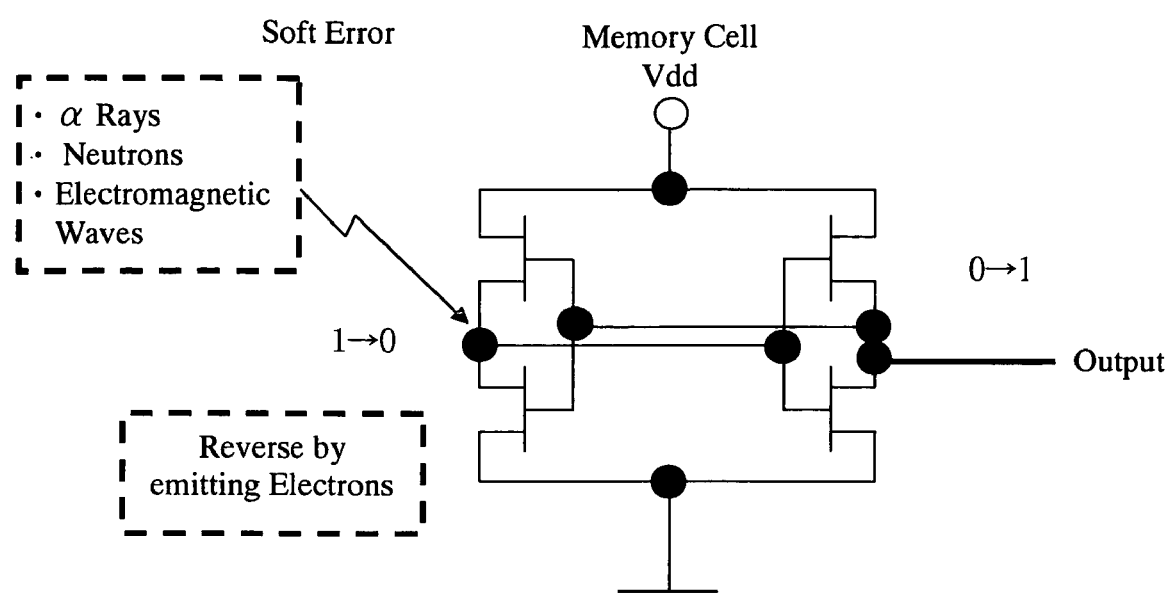
FIG. 3 is an explanatory diagram for showing a soft error that occurs in a memory cell in a host interface control circuit of a storage apparatus according to a first embodiment of the present invention.

Next, with reference to FIGS. 2 and 3, a soft error occurring in the host interface control circuit 100 of the storage apparatus according to a first embodiment of the present invention will be explained. FIG. 2 is an explanatory diagram for showing an occurrence place of a soft error that occurs in the host interface control circuit of the storage apparatus according to the first embodiment of the present invention. FIG. 3 is an explanatory diagram for showing a soft error that occurs in a memory cell in the host interface control circuit of the storage apparatus according to the first embodiment of the present invention.

As shown in FIG. 2, data at respective sections of the host interface control circuit 100 is protected.

In the interface control LSI 111, data is protected, by a resending request to the host 800 or by data ECC when errors have occurred in memory data.

Data in the HUB 112 and data in the local memory 122 and the secondary cache memory 1213 in the CPU 121 are protected by the data ECC.

However, in the primary cache memory 1212 and other general purpose registers and the likes in the CPU 121, although data protection by ECC is not conducted for attaining a high-speed process, data is protected only by parity check. Accordingly, when a soft error in which data is reversed as shown in FIG. 3 occurs in the primary cache memory 1212 and/or other general purpose resistors due to disturbances such as a rays, neutrons, and electromagnetic waves, the data is not protected by the ECC and so only a data error through the parity check is detected.

In this state, control by the CPU block 120 in which the soft error has occurred cannot be made and interface control is not carried out in the above CPU block 120, so that it is necessary to reset and restart the CPU block 120 to recover it.

COMPARATIVE EXAMPLE

Figure 4:
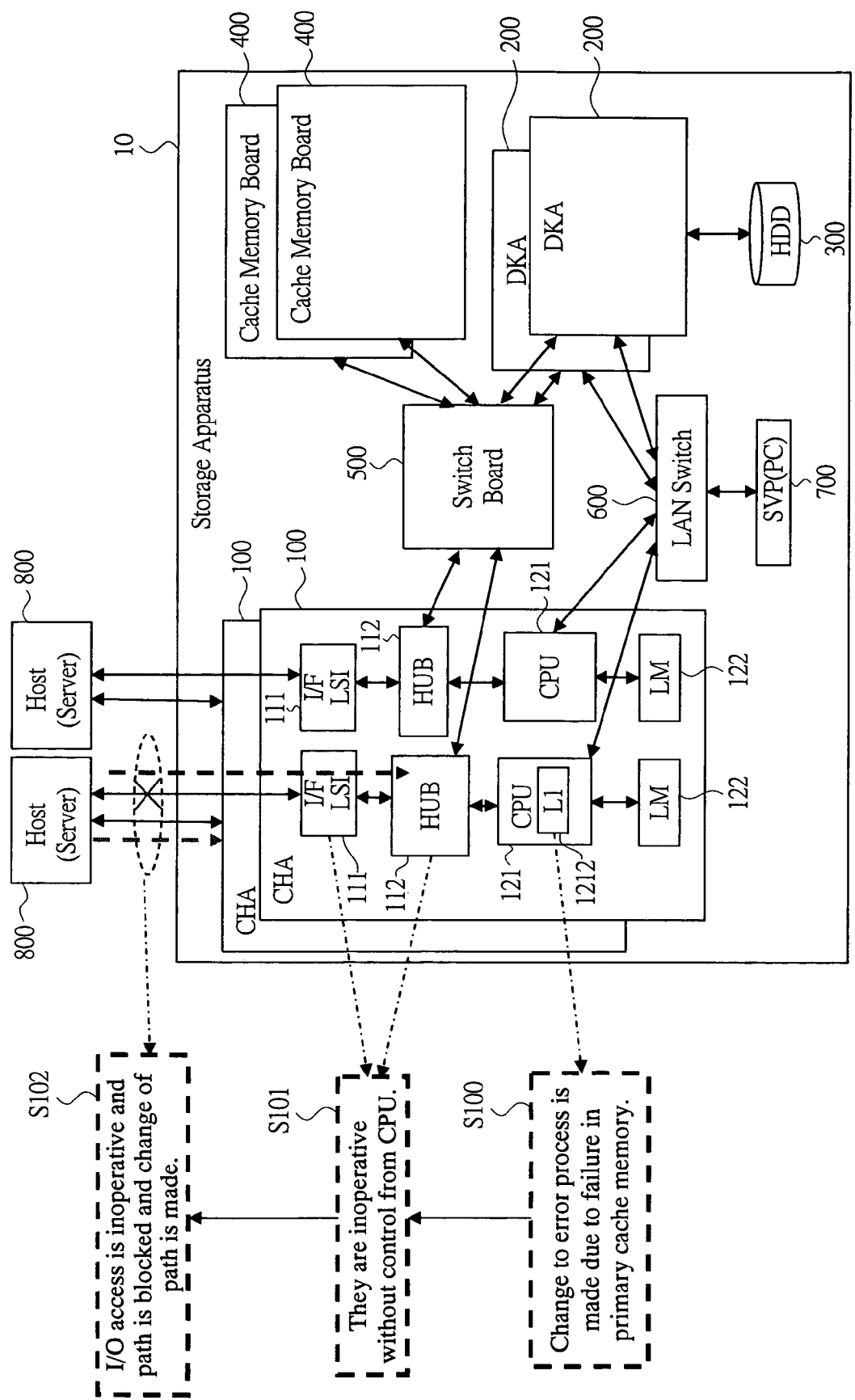
FIG. 4 is an explanatory diagram for showing a comparative example of a storage apparatus according to the first embodiment of the present invention.

Next, with reference to FIG. 4, as a comparative example of the storage apparatus according to the first embodiment of the present invention, the case where a host blocks a path at a time of occurrence of a soft error will be explained. FIG. 4 is an explanatory diagram for showing a comparative example of a storage apparatus according to a first embodiment of the present invention.

In the example shown in FIG. 4, in the host interface control circuit 100, two CPUs 121 are included and they control respectively separate interface LSIs 111 and HUBs 112.

At first, as an action when a soft error occurs, in the host interface control circuit 100 shown in FIG. 4, for example, when a soft error occurs in the primary cache memory 1212 in the CPU 121 owing to disturbances such as a rays, neutrons, and electromagnetic waves, it is changed to an error process due to failure in the primary cache memory (S100).

Then, since the CPU 121 is changed to the error process, there is no control from the CPU 121 and the interface LSI 111 and the HUB 112 become inoperative (S101).

Therefore, in the host 800, an I/O access becomes inoperative and the path is blocked at time over and is changed to another path (S102).

As in this comparative example, in the case where the host 800 blocks the path, thereafter the blocked host interface control circuit 100 is subject to exchange work by maintenance workers and, through work carried out by maintenance workers, the recovery of the host interface control circuit 100 is carried out.

On the contrary to the comparative example shown in FIG. 4, in the present embodiment, even when a soft error occurs in the CPU 121 in the host interface control circuit 100, the other CPU 121 performs the process, so that the time over does not occur on a side of the host 800 and a normal process is carried out.

Then, while the process is carried out by the other CPU 121, a reset process is performed to the CPU 121 in which the soft error has occurred. After the CPU 121 in which the soft error has occurred is recovered, the process in the CPU 121 is made back to an original process condition and the normal operation by the host interface control circuit 100 is carried out.

Further, in the present embodiment, for example, even if a soft error occurs in the primary cache memory 1212 of the CPU 121 and when there is no access to the place where the soft error has occurred, the soft error cannot be confirmed in some cases until data at the place is accessed, so that it becomes possible to separately supply the power sources to a plurality of CPUs 121 by the respective DC-DC power sources 130 and to control independently the power sources to the respective CPUs 121.

Thereby, the process of the CPU 121 is periodically shifted to that of the other CPU 121, so that it becomes possible to control the DC-DC power sources 130 and initialize the CPU 121.

<CPU Power Shutoff Operation of Storage Apparatus>

Figure 5:
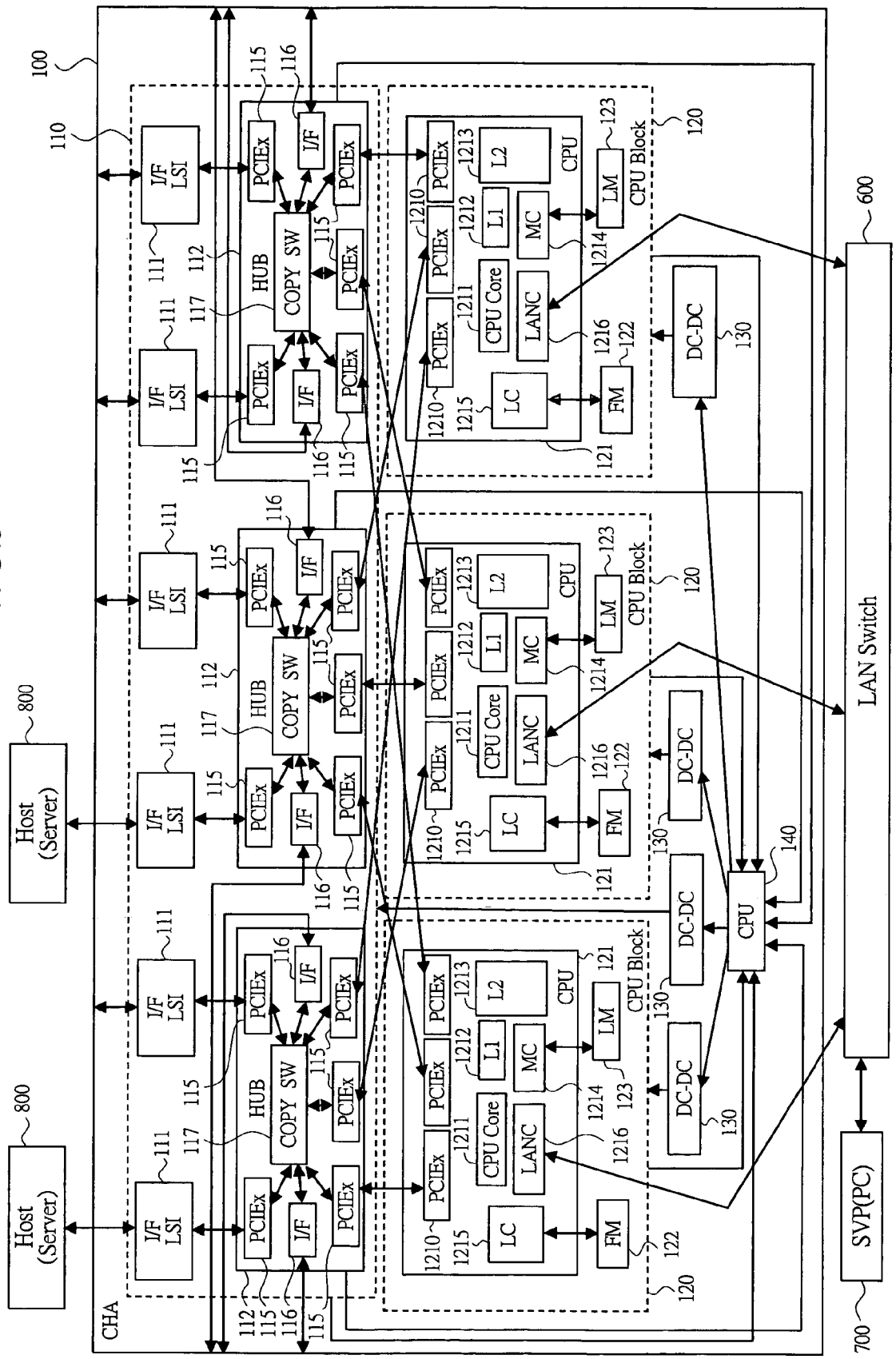
FIG. 5 is an explanatory diagram for showing a CPU power shutoff operation of a storage apparatus according to a first embodiment of the present invention.
Figure 6:
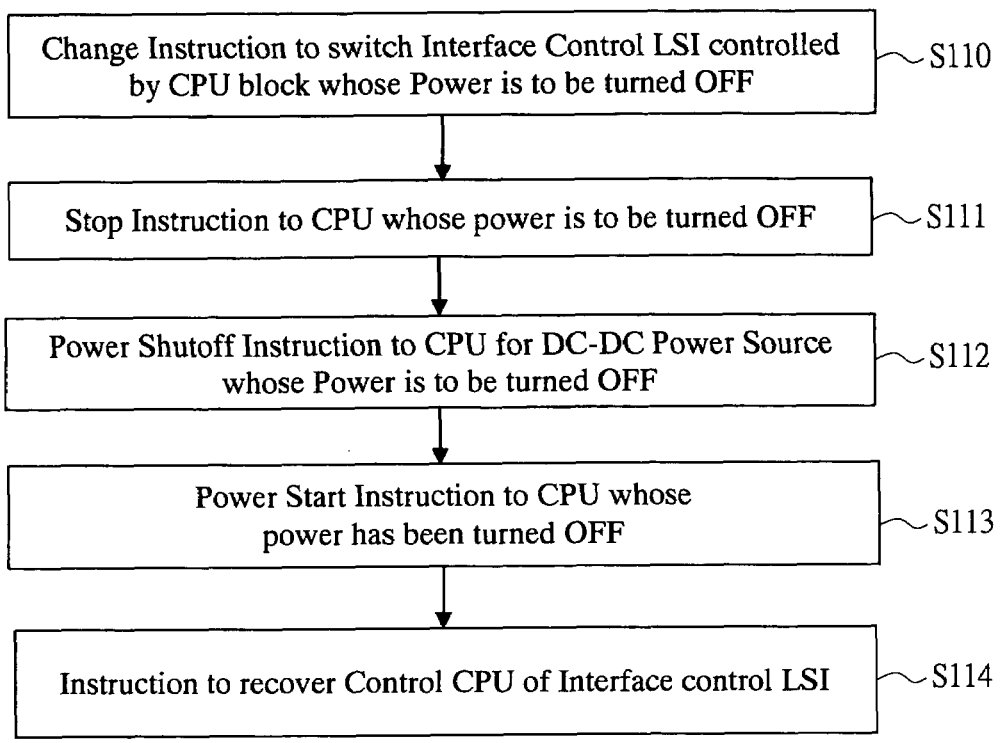
FIG. 6 is a flow chart showing a process of a service processor of a storage apparatus according to a first embodiment of the present invention.
Figure 7:
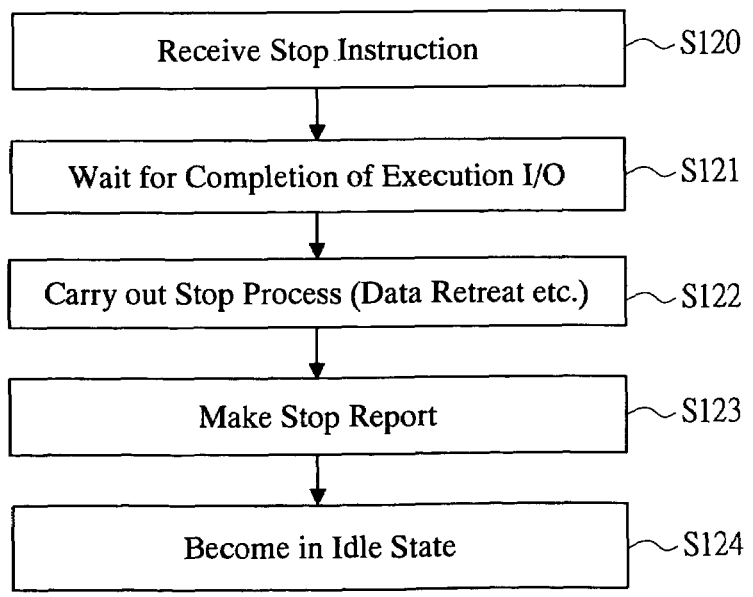
FIG. 7 is a flow chart showing an initial control process at stop of a CPU in a-storage apparatus according to a first embodiment of the present invention.
Figure 8:
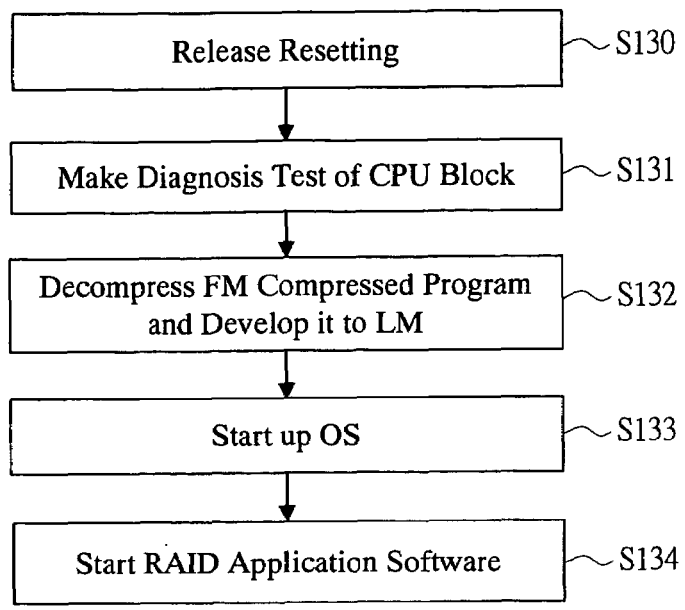
FIG. 8 is a flow chart showing an initial control process at start of a CPU in a storage apparatus according to a first embodiment of the present invention.

Next, with reference to FIGS. 5 to 8, a CPU power shutoff operation of the storage apparatus according to the first embodiment of the present invention will be explained. FIG. 5 is an explanatory diagram for showing a CPU power shutoff operation of a storage apparatus according to a first embodiment of the present invention; FIG. 6 is a flow chart showing a process of a service processor of a storage apparatus according to a first embodiment of the present invention; FIG. 7 is a flow chart showing an initial control process at stop of a CPU in a storage apparatus according to a first embodiment of the present invention; and FIG. 8 is a flow chart showing an initial control process at start of a CPU in a storage apparatus according to a first embodiment of the present invention.

In the example shown in FIG. 5, in the host interface control circuit 100, three CPUs 121 are provided. In the case where a soft error occurs in one CPU 121 and a process thereof is shifted to the other CPU 121, even if another soft error occurs in the CPU 121 to which the process has been shifted, the process is shifted to further other CPU 121, whereby the process can be continued.

Accordingly, each of the CPUs 121 and each of the HUBs 112 have respectively three PCI-Express interfaces, so that data transfer control can be carried out between the CPUs 121 and the HUBs 112.

Further, the DC-DC power sources 130 are provided to the respective CPU blocks 120 so as to supply power sources to the respective three CPU blocks 120 independently.

At first, in the case where soft errors occur in data or/and commands stored in the primary cache memory 1212 that is not used for an I/O process etc. from the host 800, the following process is used as a hot reset process for eliminating an influence on a stop of the process owing to the soft error during normal operational period by initialization of power shutoff by the DC-DC power source 130. That is, as shown in FIG. 6, by the process of the service processor 700, a change instruction is executed so that the interface control LSI 111 controlled by the CPU 121 of the CPU block 120 whose power is to be turned OFF is switched to the control by the CPU 121 of other CPU block 120 (S110).

Then, a stop instruction to the CPU 121 whose power is to be turned OFF is executed (S111), and a power shutoff instruction to the CPU 140 for the DC-DC power source 130 whose power is to be turned OFF is executed (S112).

Thereafter, a power start instruction to the CPU 121 whose power has been turned OFF is executed (S113), and an instruction to recover the control CPU 121 of the interface control LSI 111 is executed (S114).

Through the above processes, the process to the host 800 is performed by the CPU 121 other than the CPU 121 whose power is to be turned OFF, and the initialization of the CPU 121 is carried out without stopping the I/O access from the host 800. Consequently, even when the soft error occurs in the primary cache memory 1212 that is not used for the I/O process etc. from the host 800, the normal condition is attained by the initialization.

Further, as for the operations of the CPU 121 according to instructions from the service processor 700, at stop, as shown in FIG. 7, the CPU 121 receives the stop instruction (S120) and waits for completion of an execution I/O (S121) and carries out a stop process including data retreat and the like (S122).

Then, the CPU 121 makes a stop report to the service processor 700 (S123) and becomes in an idle state (S124).

Meanwhile, at start, as shown in FIG. 8, the CPU 121 releases the resetting (S130), and makes a diagnosis test of the CPU block (S131), and decompresses a compressed program in the flash memory 123, and develops the program to the local memory 122 (S132).

Then, the CPU 121 starts up the OS (S133), and starts RAID application software, whereby its operation becomes normal (S134).

By the operations at this start, it is possible to carry out a test on the CPU 121, which cannot be made during normal operations, and to eliminate influences owing to the soft error.

<Determination of Execution Period of CPU Power Shut-off>

Figure 9:
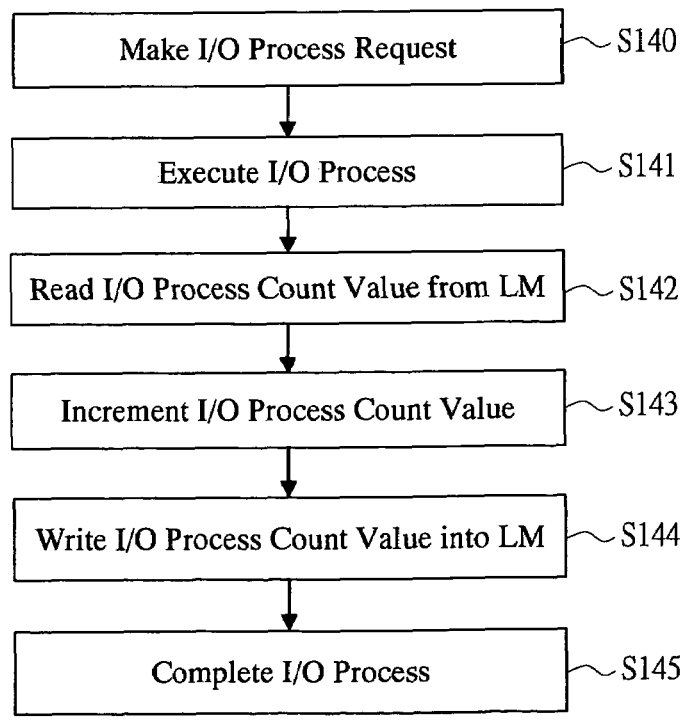
FIG. 9 is a flow chart showing a process for counting an I/O process of a storage apparatus according to a first embodiment of the present invention.
Figure 10:
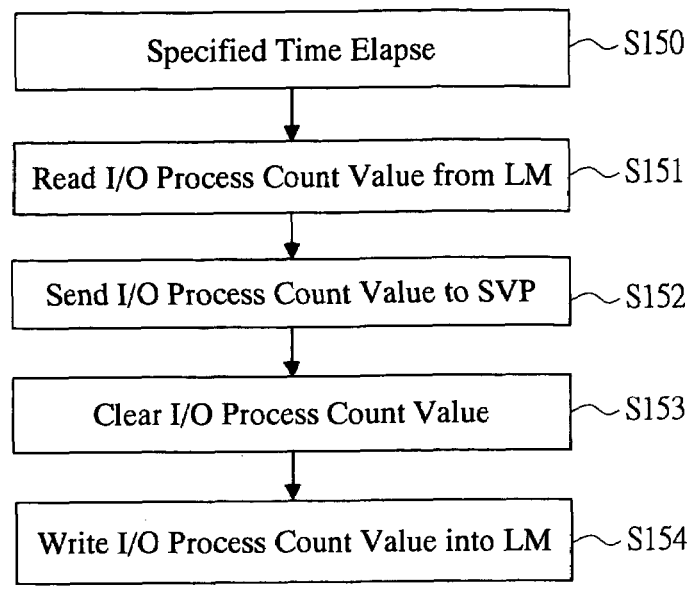
FIG. 10 is a flow chart showing a process for acquiring the number of I/O processes in a specified time in a storage apparatus according to a first embodiment of the present invention.
Figure 11:
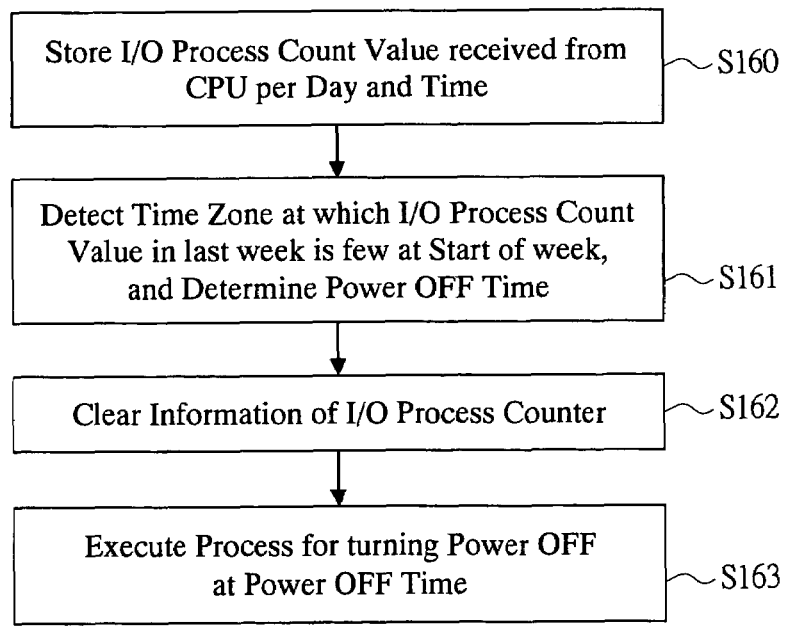
FIG. 11 is a flow chart showing a process for determining an execution period of CPU power shutoff of a storage apparatus according to a first embodiment of the present invention.

Next, with reference to FIGS. 9 to 11, an operation of determining an execution period of CPU power shutoff of a storage apparatus according to a first embodiment of the present invention will be explained. FIG. 9 is a flow chart showing a process for counting an I/O process of a storage apparatus according to a first embodiment of the present invention; FIG. 10 is a flow chart showing a process for acquiring the number of I/O processes in a specified time in a storage apparatus according to a first embodiment of the present invention; and FIG. 11 is a flow chart showing a process for determining an execution period of CPU power shutoff of a storage apparatus according to a first embodiment of the present invention.

At first, in a process of the CPU 121, as shown in FIG. 9, when an I/O process request is made (S140), the I/O process is executed (S141) and the I/O process count value is read from the local memory 122 (S142).

Then, the I/O process count value is incremented (S143), and the I/O process count value is written into the local memory 122 (S144), and the I/O process is completed (S145).

Meanwhile, as shown in FIG. 10, when a specified time elapses (S150), the I/O process count value is read from the local memory 122 (S151) and the I/O process count value is sent to the service processor 700 (S152).

Thereafter, the I/O process count value is cleared (S153), and the I/O process count value is written into the local memory 122 (S154).

Through the above processes, the I/O process count value per a specified time is sent to the service processor 700.

Further, in a process of the service processor 700, as shown in FIG. 11, the I/O process count value received from the CPU 121 is stored per day of the week and per time (S160), and, at the start of a week, the time zone at which the I/O process count value in the last week is few is detected and a power OFF time is determined (S161).

Then, information of the I/O process counter is cleared (S162), and, at the power OFF time, a process for turning the power OFF as shown in FIG. 6 is executed (S163).

Through the above processes, when the power of the CPU 121 is shut off and the CPU 121 is initialized, the process is executed at such a time zone as to make a small number of I/O accesses. Thereby, it is possible to minimize influences on the host due to performance degradation of the I/O process at a time of power shutoff of the CPU 121.

<Cold Reset Operation>

Figure 12:
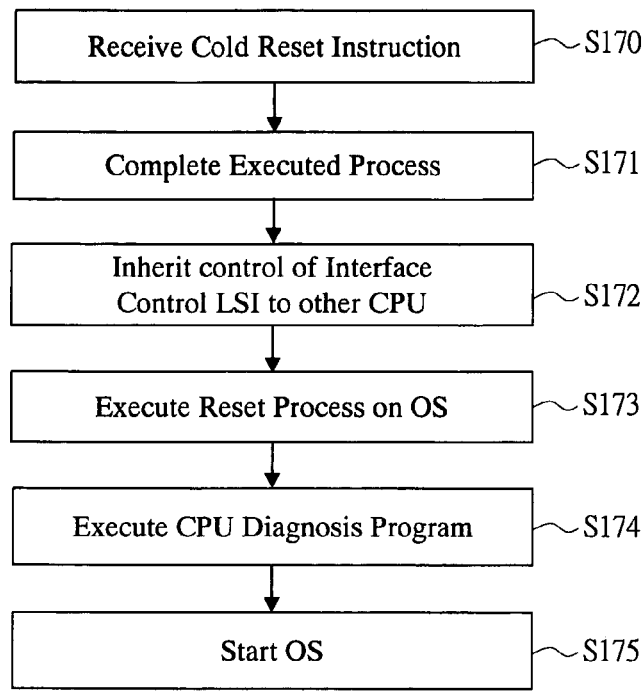
FIG. 12 is a flow chart showing a cold reset process of a storage apparatus according to a first embodiment of the present invention.
Figure 13:
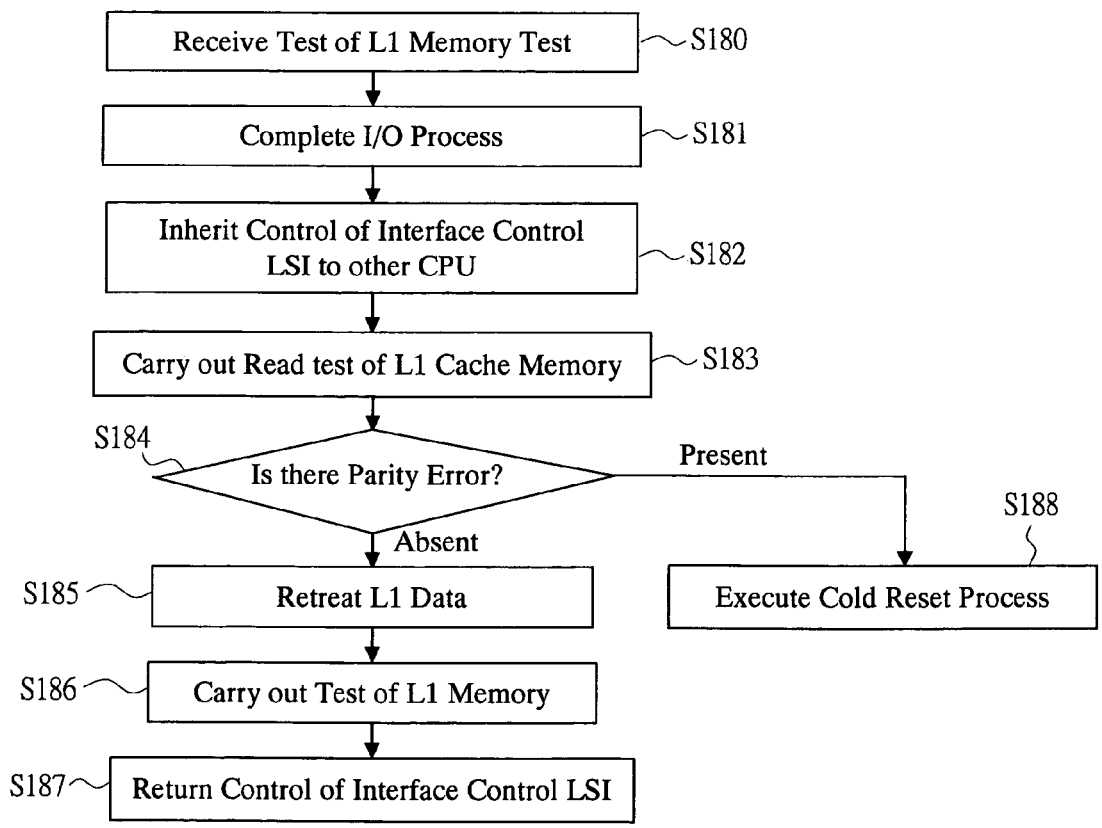
FIG. 13 is a flow chart showing a process for testing a primary cache memory of a storage apparatus according to a first embodiment of the present invention.
Figure 14:
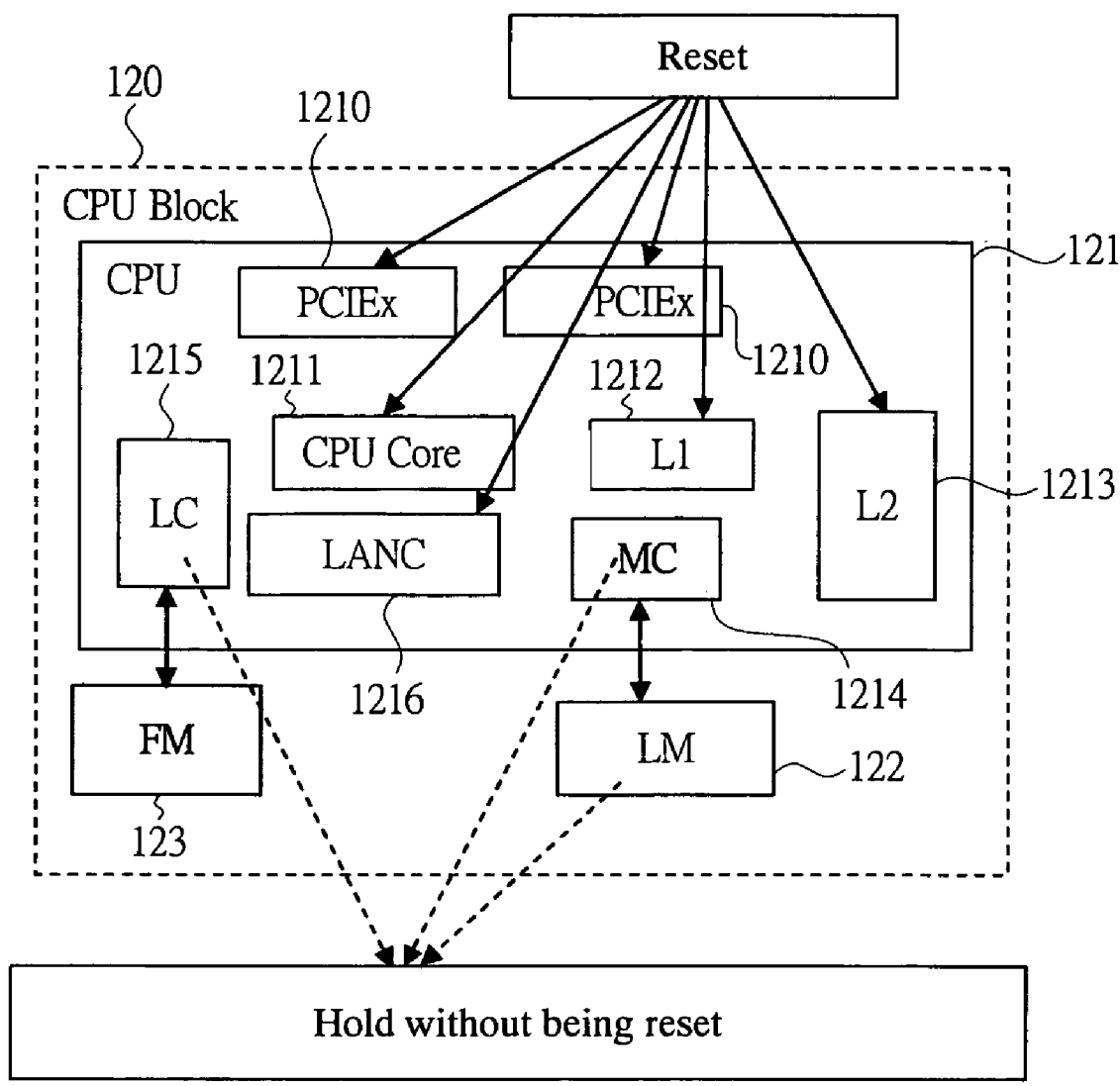
FIG. 14 is an explanatory diagram for describing places for being reset at a time of a cold reset in a storage apparatus according to a first embodiment of the present invention.

Next, with reference to FIGS. 12 to 14, a cold reset operation of resetting only a portion of a CPU in a storage apparatus according to a first embodiment of the present invention will be explained. FIG. 12 is a flow chart showing a cold reset process of a storage apparatus according to a first embodiment of the present invention; FIG. 13 is a flow chart showing a process for testing a primary cache memory of a storage apparatus according to a first embodiment of the present invention; and FIG. 14 is an explanatory diagram for describing places for being reset at a cold reset in a storage apparatus according to a first embodiment of the present invention.

Note that, in the below-mentioned explanation, a reset process to each memory means a process for initializing each memory.

In the present embodiment, as shown in FIG. 6, when the power source of the CPU 121 is shut off and the CPU 121 is initialized by the hot reset, all the circuits in the CPU 121 are reset and it takes much time to decompress the compressed program stored in the flash memory 123.

Therefore, instead of shutting off the power sources of the entire CPU block 120 and resetting the entirety, a cold reset in which the power is not shut off but only sections other than the flash memory 123 and the local memory 122 are reset may be made.

At first, in the cold reset process of the CPU 121, as shown in FIG. 12, when a cold reset instruction is received from the service processor 700 etc. (S170), the executed process is completed (S171) and the interface control LSI 111 to other CPU 121 is inherited (S172).

Then, the reset process is executed on the OS (S173), and a CPU diagnosis program is executed (S174), and the primary cache memory 1212 is tested, and the OS is started and then shifted to the normal process condition (S175).

Further, in the CPU diagnosis program at S174, as shown in FIG. 13, when the CPU diagnosis program is executed and a test for the primary cache memory is received (S180), the I/O process is completed (S181) and the interface control LSI 111 to other CPU 121 is inherited (S182).

Thereafter, a read test of the primary cache memory 1212 is carried out (S183), and it is determined whether any parity errors exist (S184).

If it is determined that the parity error is absent at S184, the data of the primary cache memory 1212 is retreated (S185) and a memory test of the primary cache memory 1212 is carried out. After the test, the retreated data of the primary cache memory 1212 is returned (S186) and the control of the interface control LSI 111 is recovered (S187).

Meanwhile, if it is determined that the parity error is present at S184, as shown in FIG. 14, a cold reset process for resetting the interfaces of the PCI-Express controller 1210, the CPU core 1211, the primary cache memory 1212, the second cache memory 1213, and the LAN controller 1216 is carried out and, by the cold reset process, the initialization of the CPU 121 is made (S185).

Through the above processes, since the power source of the CPU 121 is shut off and the CPU 121 is restarted only by the cold reset process and the initialization of the CPU 121 is carried out, it is possible to reduce the influence on the host owing to the performance degradation of the I/O process at a time of the initialization of the CPU 121.

<CPU Inheriting Process at Occurrence of Soft Error>

Figure 15:
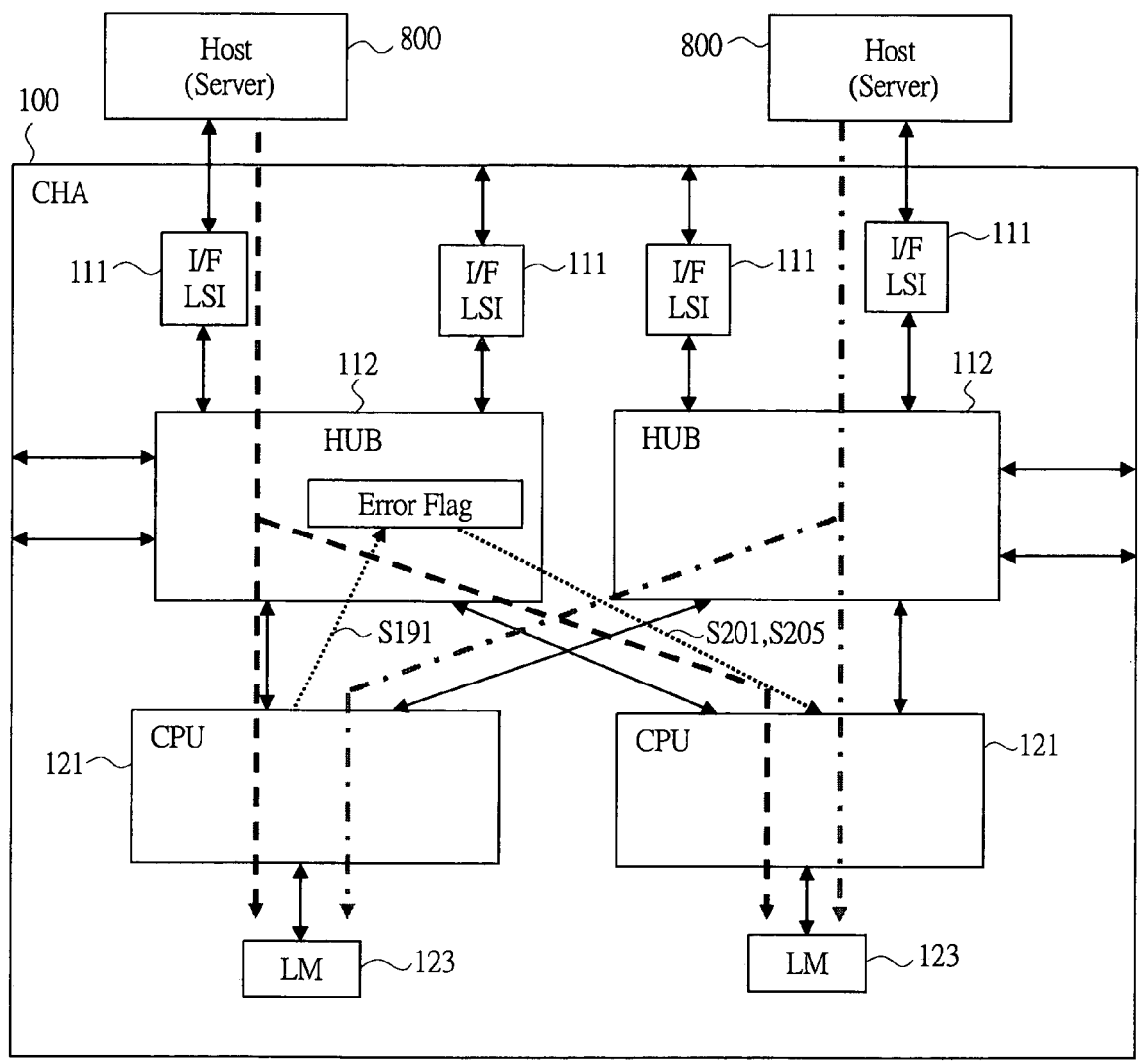
FIG. 15 is an explanatory diagram for showing a CPU inheriting process at a time of occurrence of a soft error in a storage apparatus according to a first embodiment of the present invention.
Figure 16:
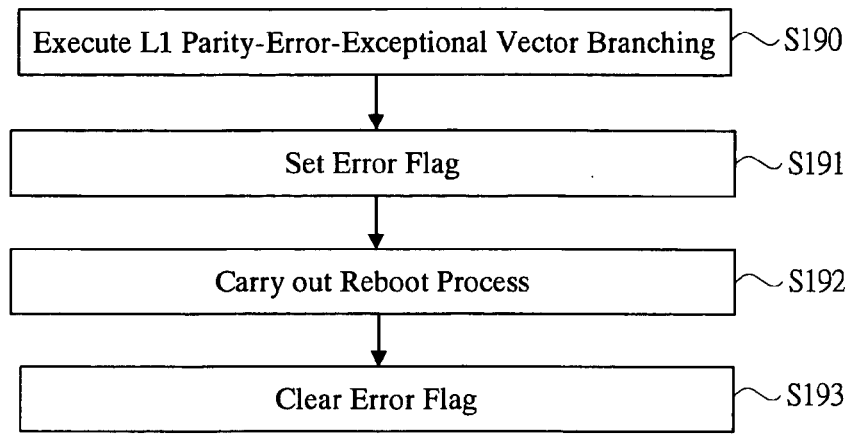
FIG. 16 is a flow chart showing a process of a CPU 121 in which a soft error has occurred in a storage apparatus according to a first embodiment of the present invention.
Figure 17:
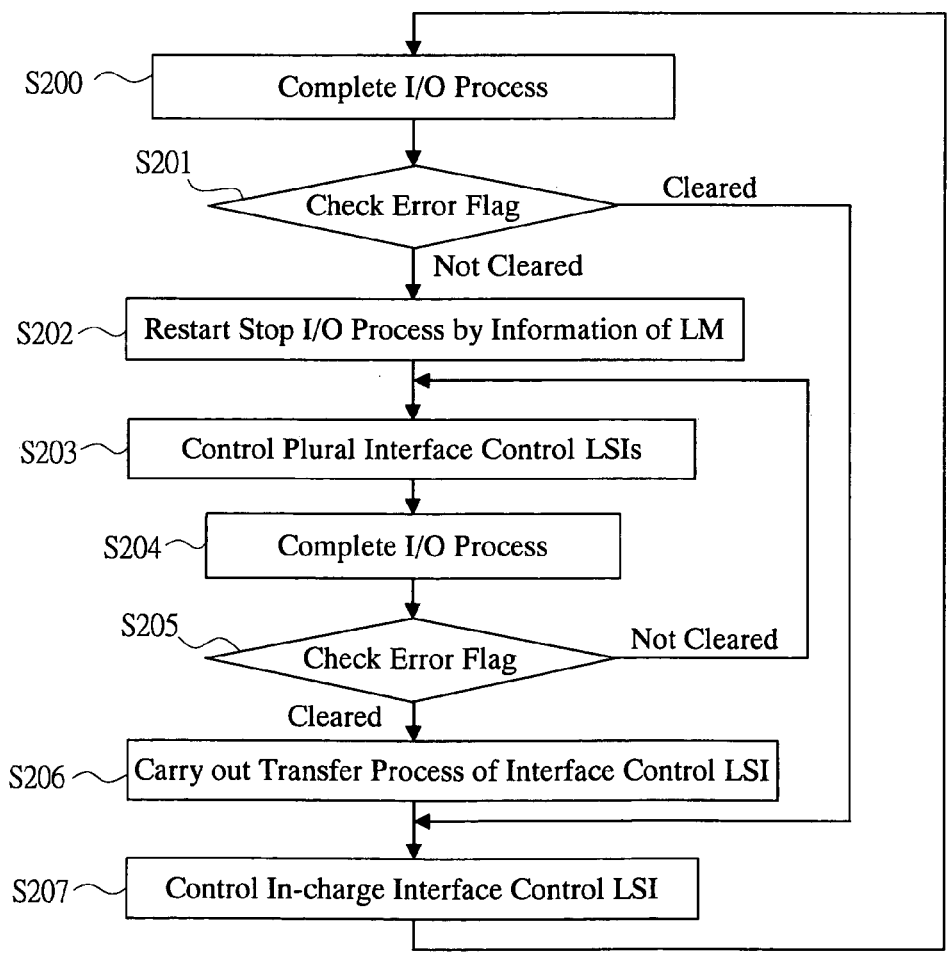
FIG. 17 is a flow chart showing a process of a CPU other than the CPU in which a soft error has occurred in a storage apparatus according to a first embodiment of the present invention.

Next, with reference to FIGS. 15 to 17, a CPU inheriting process at a time of occurrence of a soft error in a storage apparatus according to a first embodiment of the present invention will be explained. FIG. 15 is an explanatory diagram showing a CPU inheriting process at a time of occurrence of a soft error in a storage apparatus according to a first embodiment of the present invention; FIG. 16 is a flow chart showing a process of a CPU in which a soft error has occurred in a storage apparatus according to a first embodiment of the present invention; and FIG. 17 is a flow chart showing a process of a CPU other than the CPU in which a soft error has occurred in a storage apparatus according to a first embodiment of the present invention.

As shown in FIG. 15, in the present embodiment, the information of the host 800 from the interface control LSI 111 is distributed by the HUB 112, and stored into not only the local memory 122 in the CPU 121 that controls the interface control LSI 111 but also the local memory 122 in other CPU 121. Further, each CPU 121 stores, into the HUB 112, an error flag showing that an error has occurred in the primary cache memory 1212, so that the error flag in the HUB 112 can check the contents of the error flag with reference to other CPU 121.

At first, in the process of the CPU 121 in which the soft error has occurred, as shown in FIG. 16, a primary-cache parity-error-exceptional vector branching is executed due to the soft error (S190), and an error flag is set in the HUB 112 (S191).

Then, a reboot process for resetting and restarting is carried out (S192), and thereafter the error flag is cleared (S193).

Meanwhile, in the process of other CPU 121 in which no soft error has occurred, as shown in FIG. 17, when the I/O process is completed (S200), the error flag in the HUB 112 that the other CPU 121 controls is checked (S201).

As a result of the check at S201, if the error flag is not cleared, a stop I/O process is restarted by the information of the local memory 122 (S202).

Then, the plural interface control LSIs 111 are controlled (S203) and when the I/O process thereof is completed (S204), the error flag in the HUB 112 that the other CPU 121 controls is checked once again (S205).

As a result of the check at S205, if the error flag is not cleared, the process is returned to S203. As a result of the check at S205, if the error flag is cleared, a transfer process to the control of the interface control LSI 111 is carried out (S206) and the control of the in-charge interface control LSI 111 that is in charge of it is carried out (S207) and the process is returned to S200.

Meanwhile, as a result of the check at S201, if the error flag is cleared, the control of the in-charge interface control LSI 111 is carried out (S207) and the process is returned to S200.

Through the above processes, the information of the host 800 from the interface control LSI 111 is stored also into the local memory 122 of the CPU 121 other than the CPU 121 that controls the interface control LSI 111. Therefore, at a time of occurrence of the soft error, since a process is carried out by the information of the host stored in the local memory 122 of the other CPU 121, it is possible to attain recovery in a short time.

<I/O Command Duplication>

Figure 18:
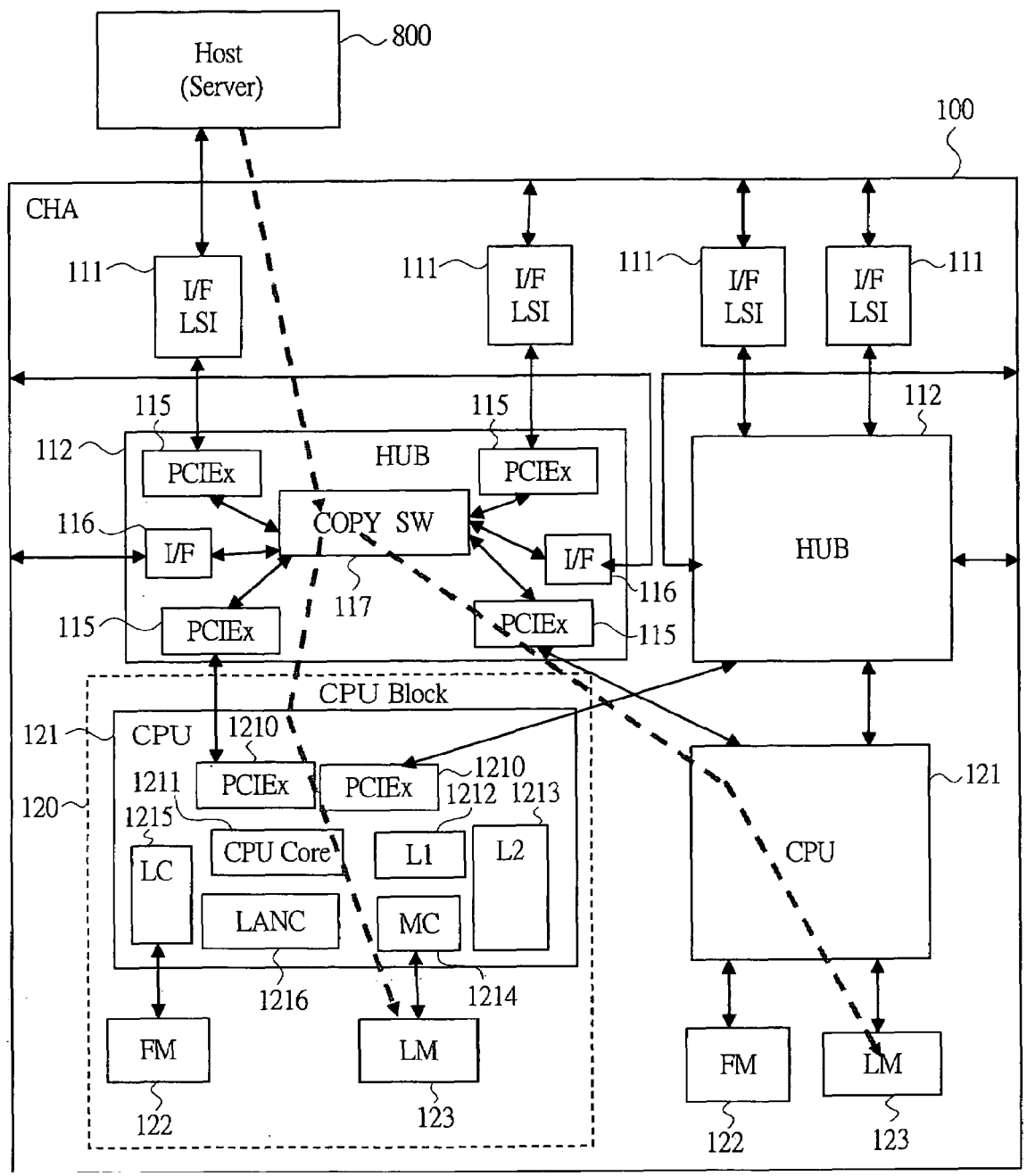
FIG. 18 is an explanatory diagram for showing duplication of I/O commands to other CPU in a storage apparatus according to a first embodiment of the present invention.

Next, with reference to FIGS. 18 and 19, duplication of I/O commands to other CPU of in a storage apparatus according to a first embodiment of the present invention will be explained. FIG. 18 is an explanatory diagram for showing duplication of I/O commands to other CPU in a storage apparatus according to a first embodiment of the present invention; and FIG. 19 is a view showing an example of a copying control circuit in a storage apparatus according to a first embodiment of the present invention.

As shown in FIG. 18, by a copying control circuit such as a switch 117 having a copying function in the HUB 112, information necessary for address is judged and duplication of I/O commands from the host 800 to the local memories 122 of the plurality of CPUs 121 is created.

In the creation of this duplication, if an interface protocol enables multicast, the duplication is created by multicast data transfer such as shared information of the cache memory board 400 via the host 800 or switch board 500.

Figure 19:
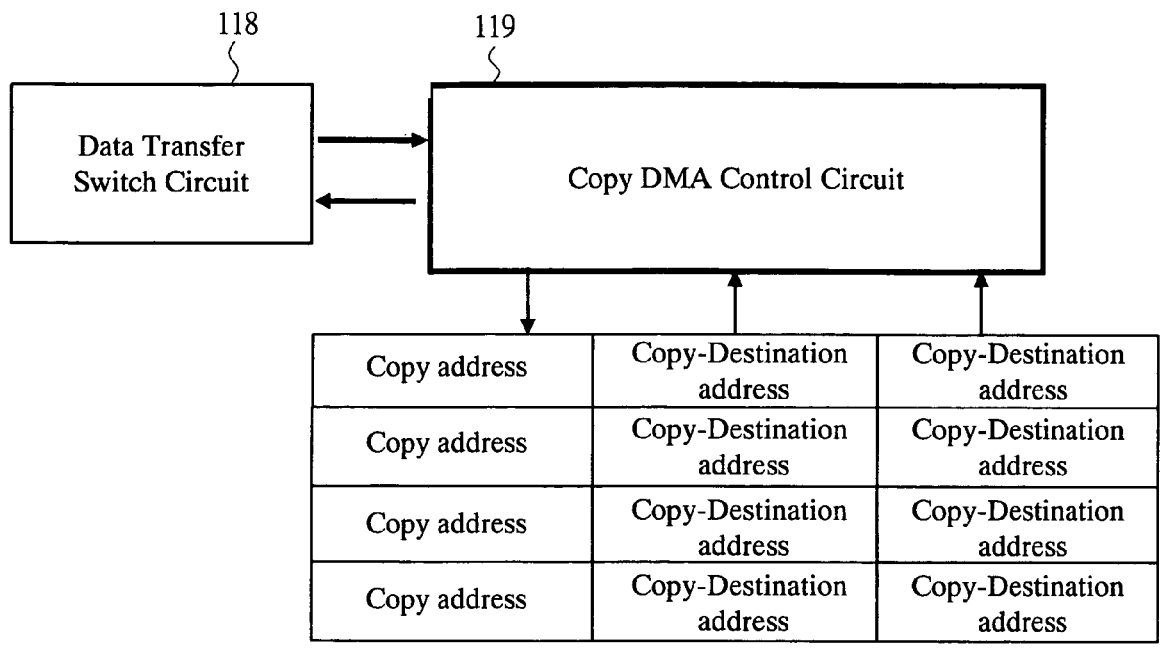
FIG. 19 is a view showing an example of a copying control circuit in a storage apparatus according to a first embodiment of the present invention.

Meanwhile, if an interface protocol does not enable multicast, as shown in FIG. 19, a copy DMA control circuit 119 is provided in order that data transfer among the respective LSIs in the HUB 112 is copied to a data transfer switch circuit 118 having a function such as a DMA. Therefore, copy addresses (copy-source addresses) and copy-destination addresses are controlled to duplicate the I/O commands.

<Data at Command Duplication>

Figure 20:
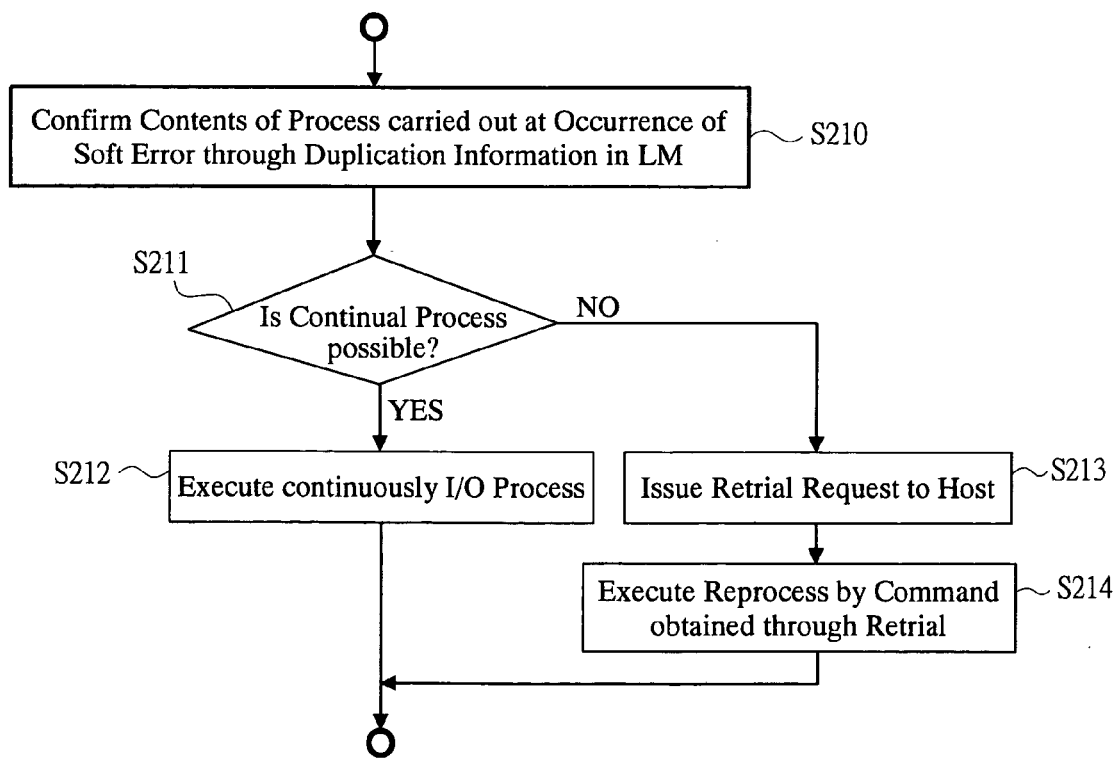
FIG. 20 is a flow chart showing an operation of duplicating information so as to continue control of a storage apparatus according to a first embodiment of the present invention.
Figure 21:
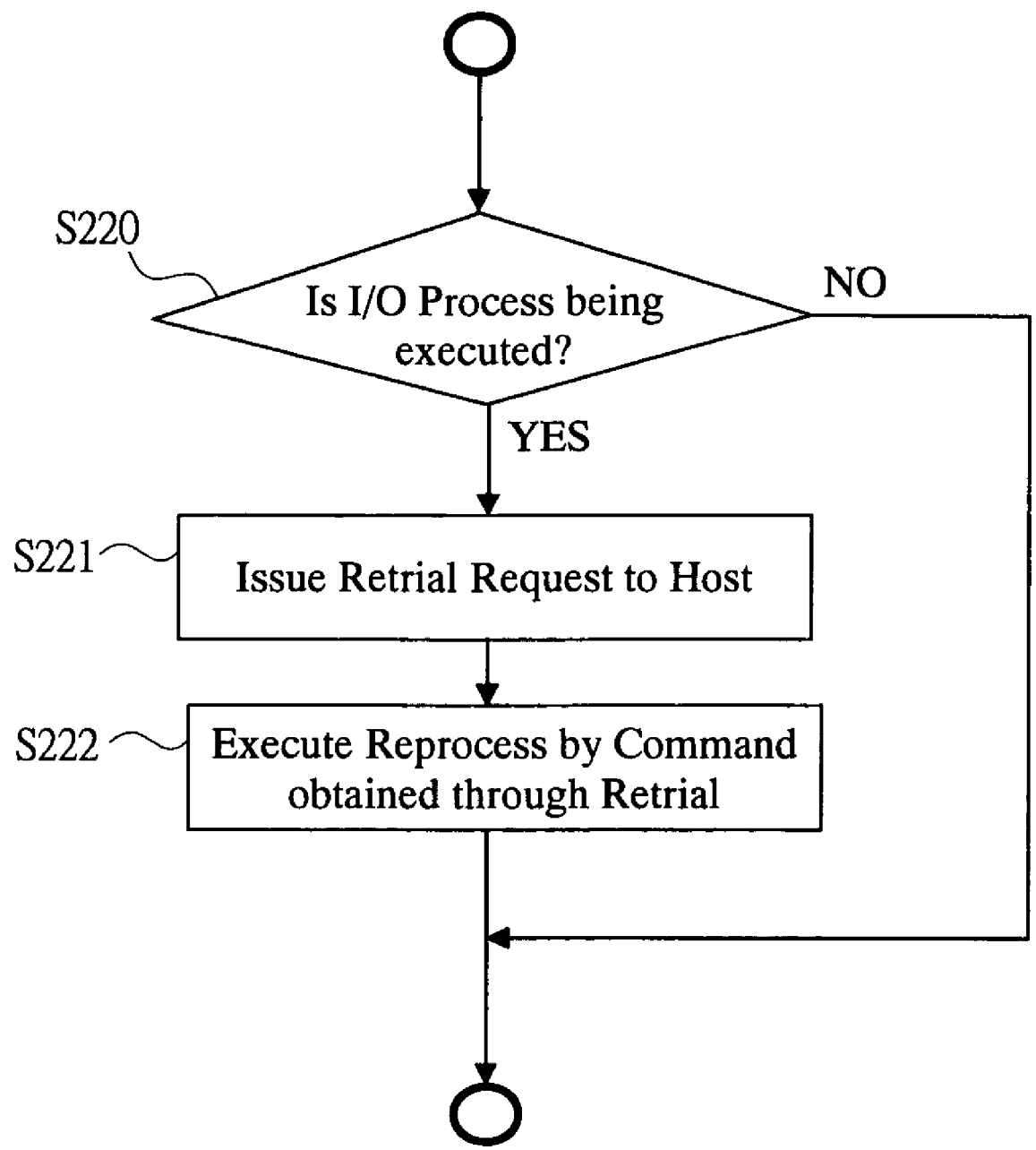
FIG. 21 is a flow chart showing an operation of duplicating also information for retrial of a storage apparatus according to a first embodiment of the present invention.

Next, with reference to FIGS. 20 and 21, data at a time of duplicating commands in a storage apparatus according to a first embodiment of the present invention will be explained. FIG. 20 is a flow chart showing an operation of duplicating information so as to continue the control of a storage apparatus according to a first embodiment of the present invention; and FIG. 21 is a flow chart showing an operation of duplicating also information for retrial of a storage apparatus according to a first embodiment of the present invention.

At first, in an operation of duplicating information so as to continue the control thereof, as shown in FIG. 20, the contents of a process carried out when the soft error has occurred are confirmed (S210) through duplication information in the local memory 122, and it is judged whether a continual process is possible or impossible (S211).

Then, if it is judged that the continual process is possible at S211, the I/O process is continuously executed (S212).

On the other hand, if it is judged that the continual process is impossible at S211, a retrial request is issued to the host

800 (S213) and a reprocess is executed by a command obtained through the retrial request (S214).

Meanwhile, in an operation of duplicate only information for retrials such as command codes, command tags, and command IDs, as shown in FIG. 21, it is judged whether the I/O process is being executed (S220). If the I/O process is not being executed at S220, the process is completed. If the I/O process is being executed at 220, a retrial request is issued to the host 800 (S221) and a reprocess is executed by a command obtained through the retrial request (S222).

Through the above processes, the process may be continued by duplicating all the I/O commands. Or, in order to reduce information to be duplicated, only information to which retrials can be made is duplicated and, in the case of performing the process to the other CPU 121 at a time of occurrence of the soft error, the retrial request to the host 800 is issued by the information for retrials such as command codes, command tags, and command IDs stored in the local memory 122, whereby allowing commands to be obtained and the process to continue.

<Operation at Emergency Destage>

Figure 22:
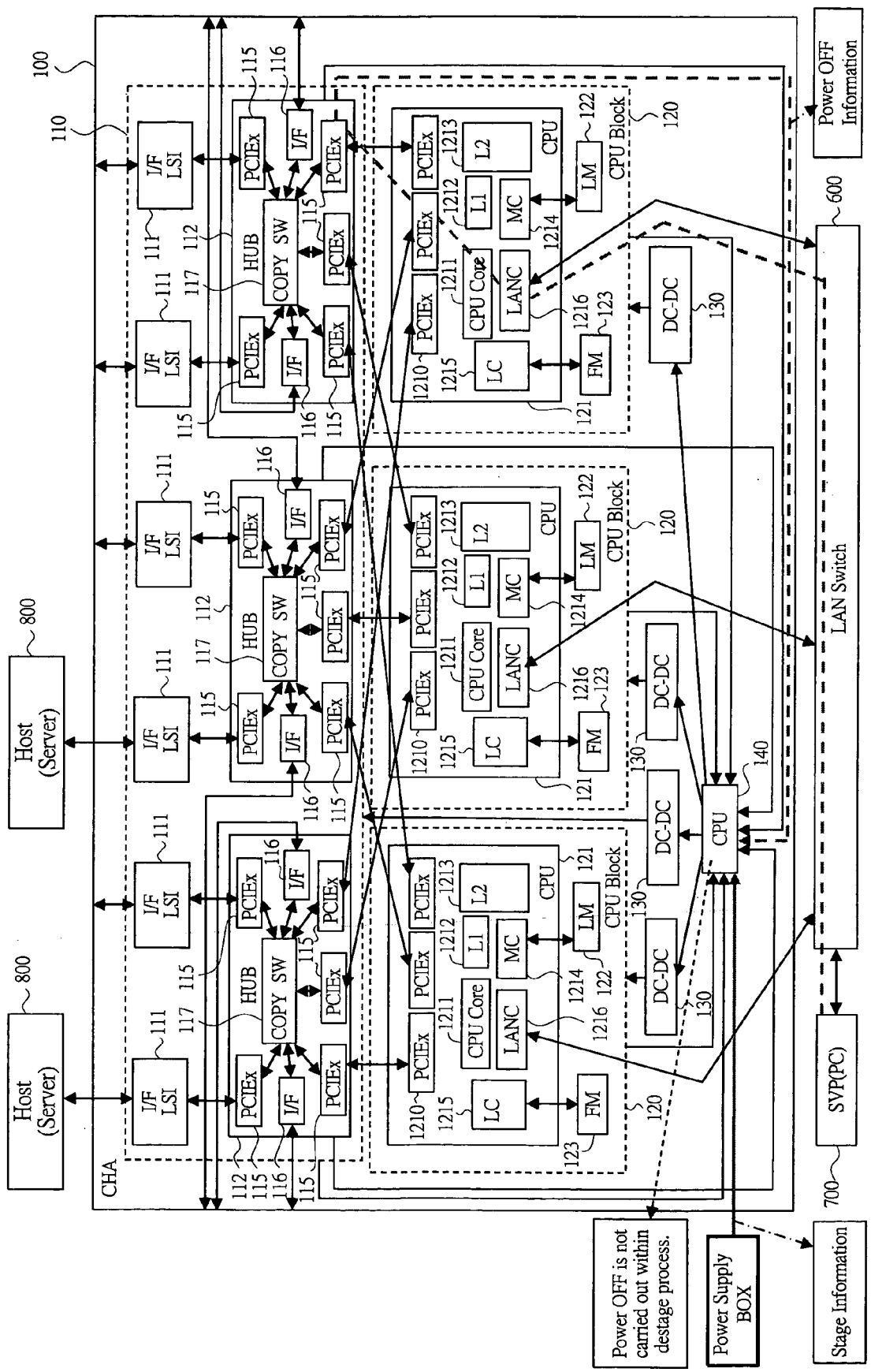
FIG. 22 is an explanatory diagram for showing an operation at a time of emergency destage of a storage apparatus according to a first embodiment of the present invention.

Next, with reference to FIG. 22, an operation at a time of emergency destage of a storage apparatus according to a first embodiment of the present invention will be explained. FIG. 22 is an explanatory diagram for showing an operation at a time of emergency destage of a storage apparatus according to a first embodiment of the present invention.

In the present embodiment, while the storage apparatus 10 is carrying out an emergency destage process, destage information at the emergency destage is inputted to the CPU 140 that controls the DC-DC power source 130 and even if an operation of initializing the CPU 121 by the power source shutoff as shown in FIG. 6 is carried out, the CPU 140 is controlled so that the power from the DC-DC power source 130 to the CPU 120 cannot be shut off.

Thereby, it is possible to prevent the CPU operating at the emergency destage from becoming in short even if the initialization operation of the CPU 121 starts during the emergency destage operation.

Second Embodiment

Figure 23:
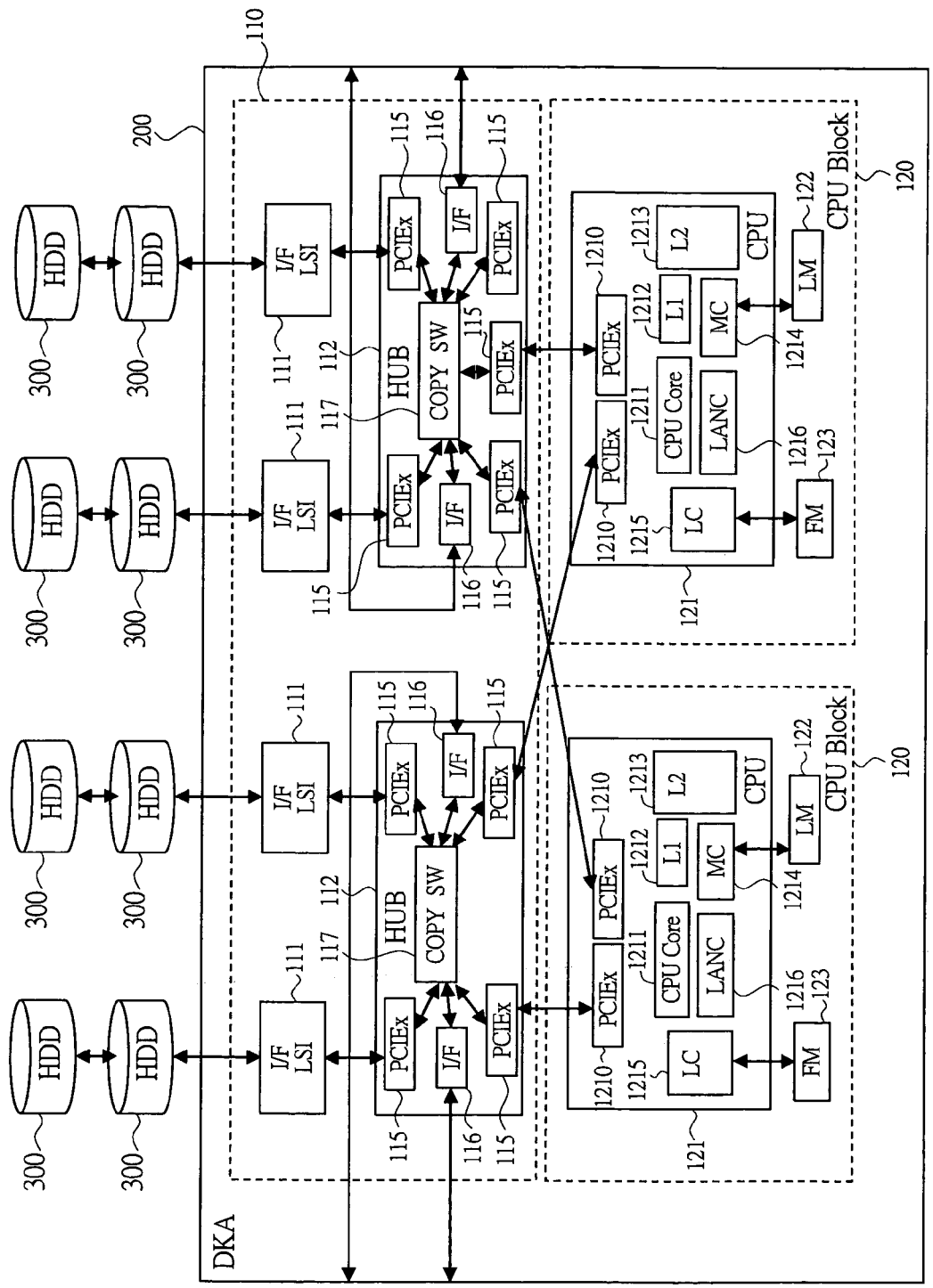
FIG. 23 is a block diagram showing a configuration of a disk interface control circuit in a storage apparatus according to a second embodiment of the present invention.
Figure 24:
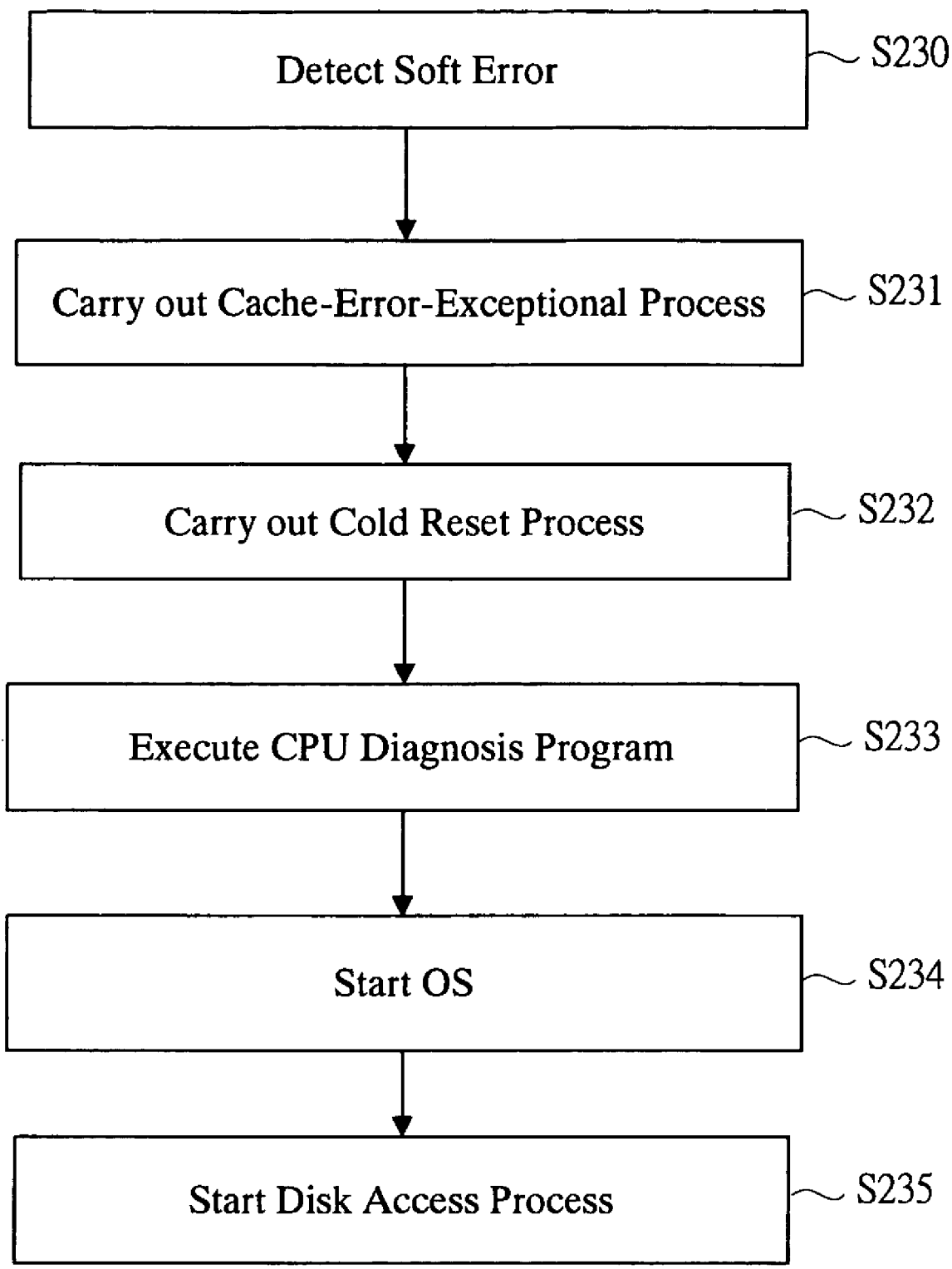
FIG. 24 is a flow chart showing an operation at a time of occurrence of a soft error in a storage apparatus according to a second embodiment of the present invention.

In the first embodiment, the operation at the time of occurrence of the soft error in the host interface control circuit 100 has been described. However, the disk interface control circuit 200 may carry out the same processes as it. With reference to FIGS. 23 and 24, an operation at a time of occurrence of a soft error in a storage apparatus according to a second embodiment of the present invention will be explained. FIG. 23 is a block diagram showing a configuration of a disk interface control circuit in a storage apparatus according to a second embodiment of the present invention, and FIG. 24 is a flow chart showing an operation at a time of occurrence of a soft error in a storage apparatus according to a second embodiment of the present invention.

In the present embodiment, as shown in FIG. 23, the disk interface control circuit 200 is intended to have the same configuration as that of the host interface control circuit 100 in the first embodiment, so that the physical memory devices 300 and the interface control LSIs 111 are connected to one another and data transfer to each CPU 121 may be conducted by the HUB 112.

In the present embodiment, the disk interface control circuit 200 does not carry out the cold reset process and the power shutoff at the time of the emergency destage, which are executed in the first embodiment.

In the cold reset process, as shown in FIG. 24, when a soft error is detected (S230), a cache-error-exceptional process is carried out (S231) and the cold reset process is carried out (S232). Then, a CPU diagnosis program is executed (S233), the OS is started (S234), and a disk access process is started (S235).

Note that, in the process in the disk interface control circuit 200, there is no blockage by time over, so that even if the operation is stopped during the soft reset, there is little influence thereon. Therefore, although the example of the operations as shown in FIG. 24 has been described above, similarly to the first embodiment it is also possible to duplicate data such as commands by the HUB 112 and to continue the process by the CPU 121 in which no soft error occurs.

Further, similarly to the first embodiment also regarding the operation at the time of the emergency destage, by the DC-DC power source 130 that supplies power to each CPU block 120, even when power supply to each CPU block 120 is controlled independently and initialization of the CPU 121 in the CPU block 120 is carried out, the DC-DC power source 130 is controlled and the power to the CPU 121 is not shut off.

Thereby, it is possible to prevent the CPUs operating at the time of the emergency destage from becoming in short even if the initialization operation of the CPU 121 starts during the emergency destage operation.

Third Embodiment

<Soft Error Process by E-NAS>

The present embodiment is intended to have a configuration using an E-NAS (E-Network Attached Storage, network connection storage) instead of the host interface control circuit 100 in the first embodiment, wherein a process at a time of occurrence of a soft error in an E-NAS is carried out.

Figure 25:
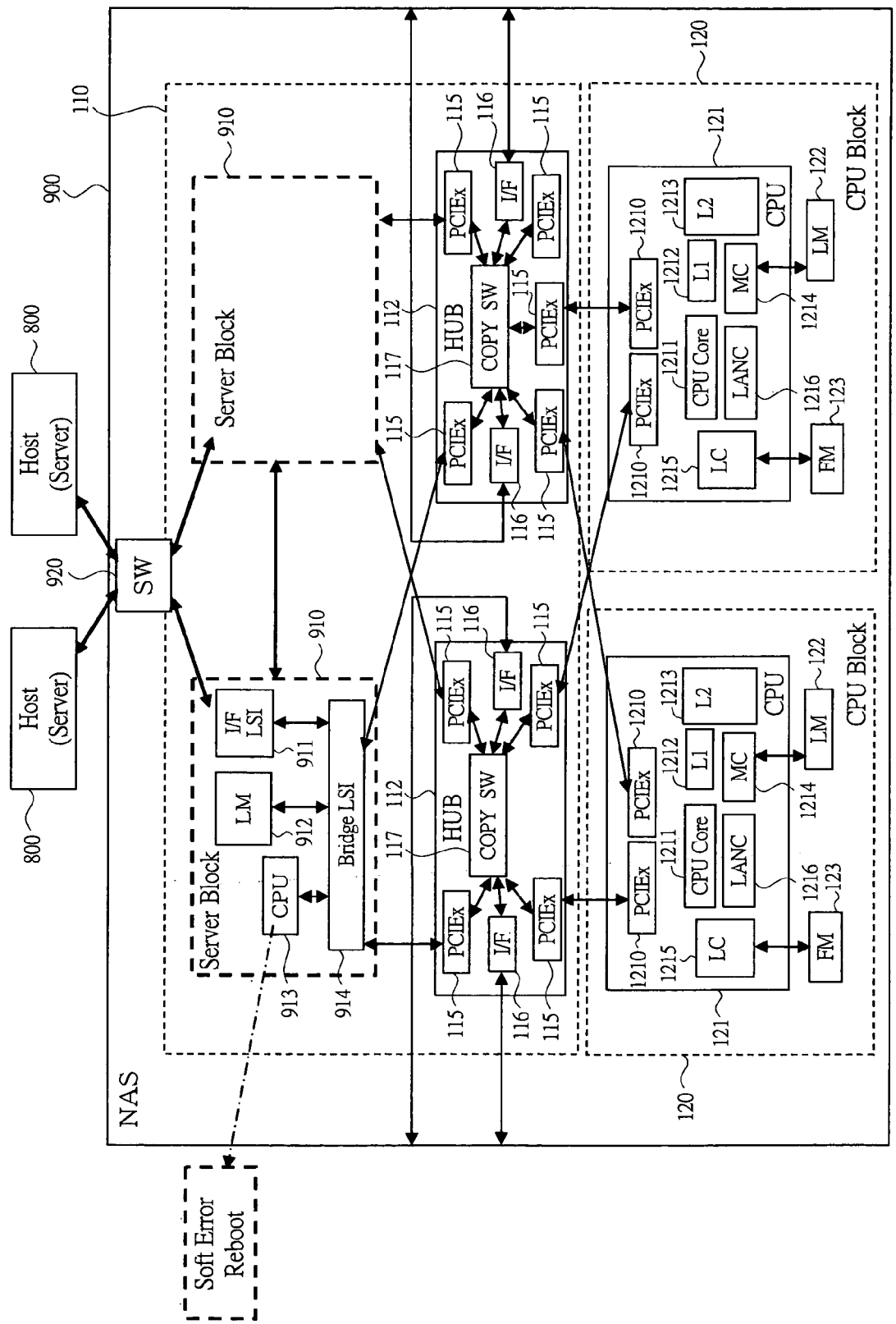
FIG. 25 is a block diagram showing a configuration of an E-NAS of a storage apparatus according to a third embodiment of the present invention.

With reference to FIG. 25, a configuration of an E-NAS of a storage apparatus according to a third embodiment of the present invention will be described. FIG. 25 is a block diagram showing a configuration of an E-NAS of a storage apparatus according to a third embodiment of the present invention.

In FIG. 25, in an E-NAS 900, the interface control LSI 111 in the host interface control circuit 100 described in the first embodiment is configured as a server block 910.

The server block 910 comprises an interface control LSI 911, a local memory 912, a CPU 913, and a bridge LSI 914, wherein the data transfer thereof with the host 800 is controlled by the server block 910.

Further, between the server blocks 910, error information may be exchanged with each other to confirm mutual error information.

Further, between the host 800 and the server block 910, for example, a switch 920 or the like is connected, so that even when the soft error occurs in the CPU 913 in the server block 910, a process can be made by other server block 910.

In the present embodiment, when the soft error occurs in the CPU 913 in the server block 910, the cold reset process is carried out to the inside of the server block 910 and the initialization thereof is made similarly to the first embodiment.

Further, regarding the operation required for the soft error in other HUB 112 or CPU block 120, the same operations as those in the host interface control circuit 100 described in the first embodiment are carried out.

As mentioned above, the invention made by the inventor of the present invention has been described based on the embodiments. However, needless to say, the present invention is not limited to the above-mentioned embodiments and can be variously altered and modified without departing from the gist thereof.

What is claimed is:

1. A storage apparatus comprising:
a plurality of host interface control circuits controlling data transfer with a host device;
a disk interface control circuit controlling data transfer with a physical memory device;
a cache memory temporarily storing said data; and
a switch connecting said host interface control circuits, disk interface control circuit, and cache memory,
wherein each of said host interface control circuits has two or more microprocessors, and
when a soft error occurs in said microprocessor, a data transfer process with said host device is inherited to the other microprocessor in which the soft error does not occur, so that a reset process is carried out to the microprocessor in which said soft error has occurred.

2. The storage apparatus according to claim 1,
wherein the reset process to the microprocessor in which the soft error has occurred in said host interface control circuits is executed by shutting off power to be supplied to said microprocessor.

3. The storage apparatus according to claim 1,
wherein the reset process to the microprocessor in which the soft error has occurred in said host interface control circuits is executed by initializing a primary cache and a secondary cache in said microprocessor.

4. The storage apparatus according to claim 1,
wherein, even when the soft error is not detected in said microprocessors, said host interface control circuits make said data transfer process by the microprocessor inherited to the other microprocessor after an elapse of a specified time and carry out the reset process.

5. The storage apparatus according to claim 4,
wherein each of said host interface control circuits counts an I/O process from said host device, and detects a time zone having a few number of said I/O process, and carries out said reset process in said time zone having a few number of said I/O process.

6. The storage apparatus according to claim 1,
wherein each of said host interface control circuits has a HUB provided between said microprocessor and said host device, and
said HUB transfers command data from said host device, also to the microprocessor other than said microprocessor that processes the data transfer of said host device.

7. The storage apparatus according to claim 6,
wherein, in said HUB, the data to be transferred to the microprocessor other than said microprocessor that processes the data transfer of said host device is the same as that to said microprocessor that processes the data transfer of said host device.

8. The storage apparatus according to claim 6,
wherein, in said HUB, the data to be transferred to the microprocessor other than said microprocessor that processes the data transfer of said host device is data, which enables a resending request to said host device, in the data to said microprocessor that processes the data transfer of said host device.

9. The storage apparatus according to claim 6,
wherein said HUB includes a copy control circuit that controls a copy-source address and a copy-destination address for carrying out a transfer process to the microprocessor other than said microprocessor that processes the data transfer of said host device, the copy control circuit carrying out the transfer process.

10. A storage apparatus comprising:
a plurality of host interface control circuits controlling data transfer with a host device;
a disk interface control circuit controlling data transfer with a physical memory device;
a cache memory temporarily storing said data; and
a switch connecting said host interface control circuits, disk interface control circuit, and cache memory,
wherein said disk interface control circuit has two or more microprocessors, and
when a soft error occurs in said microprocessor, a data transfer process with said physical memory device is inherited to the microprocessor in which the soft error does not occur, so that a reset process is carried to the microprocessor in which said soft error has occurred.

11. The storage apparatus according to claim 10,
Wherein the reset process to the microprocessor in which the soft error has occurred in said disk interface control circuit is executed by shutting off power to be supplied to said microprocessor.

12. The storage apparatus according to claim 10,
wherein the reset process to the microprocessor in which the soft error has occurred in said disk interface control circuit is executed by initializing a primary cache and a secondary cache in said microprocessor.

13. The storage apparatus according to claim 10,
wherein, even when the soft error is not detected by said microprocessors, said disk interface control circuit makes the data transfer process by said microprocessor inherited to the other microprocessor after an elapse of a specified time and carries out the reset process.

14. The storage apparatus according to claim 13,
wherein said disk interface control circuit counts an I/O process to said physical memory device, and detects a time zone having a few number of said I/O process, and carries out the reset process in said time zone having a few number of said I/O process.

15. The storage apparatus according to claim 10,
wherein said disk interface control circuit has a HUB provided between said microprocessor and said physical memory device, and
said HUB transfers command data from said physical memory device also to the microprocessor other than said microprocessor that processes the data transfer of the physical memory device.

16. A storage apparatus comprising:
a plurality of network connection storages that control data transfer with a host device;
a disk interface control circuit controlling data transfer with a physical memory device;
a cache memory storing temporarily said data; and
a switch connecting said network connection storages, disk interface control circuit, and cache memory,
wherein each of said network connection storages has two or more server blocks, and
when a soft error occurs in a microprocessor in said server blocks, a data transfer process with said host device is inherited to the server block in which said soft error does not occur, so that a reset process is carried out to the microprocessor in the server block in which said soft error has occurred.

17. The storage apparatus according to claim 16, wherein the reset process to the microprocessor, in which the soft error has occurred, by said network connection storages is executed by shutting off power to be supplied to said microprocessor.

18. The storage apparatus according to claim 16, wherein the reset process to the microprocessor, in which the soft error has occurred, by said network connection storages is executed by initializing a primary cache and a secondary cache in said microprocessor.

19. The storage apparatus according to claim 16, wherein, even when the soft error is not detected in said microprocessor in said server blocks, each of said network connection storage makes the data transfer process by said server block inherited to other server block after an elapse of a specified time and carries out the reset process.

20. The storage apparatus according to claim 19, wherein each of said network connection storages counts an I/O process from said host device, and detects a time zone having a few number of said I/O process, and carries out the reset process in the time zone having a few number of said I/O process.

\* \* \* \* \*